US007977430B2

(12) United States Patent
Devlin et al.

(10) Patent No.: US 7,977,430 B2
(45) Date of Patent: Jul. 12, 2011

(54) CROSSLINKABLE POLYUREA PREPOLYMERS

(75) Inventors: Brian Gerrard Devlin, Suwanee, GA (US); Mireille Tena, Daettwilerstrasse (CH)

(73) Assignee: Novartis AG, Basel (CH)

( * ) Notice: Subject to any disclaimer, the term of this patent is extended or adjusted under 35 U.S.C. 154(b) by 555 days.

(21) Appl. No.: 10/991,124

(22) Filed: Nov. 17, 2004

(65) Prior Publication Data
US 2005/0113549 A1 May 26, 2005

Related U.S. Application Data

(60) Provisional application No. 60/525,100, filed on Nov. 25, 2003.

(51) Int. Cl.
*C08F 8/00* (2006.01)
*C08G 18/67* (2006.01)
*G02C 7/02* (2006.01)

(52) U.S. Cl. ........ 525/131; 525/123; 525/127; 525/128; 525/455; 525/459; 522/90; 522/97; 522/173; 522/174; 351/160 H; 351/160 R

(58) Field of Classification Search .................. 525/131, 525/123, 127, 128, 459, 455, 903; 522/90, 522/97, 173, 174; 351/160 H, 160 R
See application file for complete search history.

(56) References Cited

U.S. PATENT DOCUMENTS

| 3,719,050 A | 3/1973 | Aseo et al. ............... 61/36 |
| 3,786,034 A | 1/1974 | Blair et al. ............... 260/77.5 |
| 3,821,136 A | 6/1974 | Hudgin et al. ............ 260/9 |
| 3,822,238 A | 7/1974 | Blair et al. ............... 260/75 |
| 3,939,105 A | 2/1976 | Jones, Jr. et al. ......... 260/2.5 |
| 4,057,598 A | 11/1977 | Lundberg et al. ......... 260/857 |
| 4,104,824 A | 8/1978 | Lundberg et al. ......... 47/58 |
| 4,118,354 A | 10/1978 | Harada et al. ............ 260/29.2 |
| 4,255,550 A | 3/1981 | Gould ...................... 528/44 |
| 4,359,558 A | 11/1982 | Gould et al. .............. 525/454 |
| 4,403,083 A | 9/1983 | Marans et al. ............. 528/44 |
| 4,408,023 A | 10/1983 | Gould et al. .............. 525/454 |
| 4,454,309 A | 6/1984 | Gould et al. .............. 525/454 |
| 4,490,423 A | 12/1984 | Gould et al. .............. 428/36 |
| 4,496,535 A | 1/1985 | Gould et al. .............. 424/19 |
| 4,543,398 A * | 9/1985 | Bany et al. ............... 525/474 |
| 4,576,850 A | 3/1986 | Martens ................... 428/156 |
| 4,582,885 A | 4/1986 | Barber ..................... 528/28 |
| 4,584,245 A | 4/1986 | Kuga et al. ............... 428/409 |
| 4,623,592 A | 11/1986 | Daude et al. .............. 428/423.3 |
| 4,644,033 A | 2/1987 | Gnanou et al. ............ 524/590 |
| 4,668,558 A | 5/1987 | Barber ..................... 428/156 |
| 4,668,564 A | 5/1987 | Orchard .................... 428/246 |
| 4,689,386 A | 8/1987 | Chapman et al. ......... 528/71 |
| 4,749,592 A | 6/1988 | Gasper et al. ............. 427/140 |
| 4,767,671 A | 8/1988 | Parker et al. ............. 428/412 |
| 4,780,488 A | 10/1988 | Su et al. .................. 523/106 |
| 4,786,657 A | 11/1988 | Hammar et al. ........... 522/90 |
| 4,810,582 A | 3/1989 | Gould et al. .............. 428/423.1 |
| 4,816,509 A | 3/1989 | Fukushima et al. ......... 524/413 |
| 4,844,983 A | 7/1989 | Parker et al. ............. 428/425.6 |
| 4,857,606 A | 8/1989 | Su et al. .................. 525/455 |
| 4,886,866 A | 12/1989 | Brantz et al. ............. 528/59 |
| 5,034,461 A | 7/1991 | Lai et al. ................. 525/100 |
| 5,039,458 A | 8/1991 | Brantz et al. ............. 264/2.6 |
| 5,039,769 A | 8/1991 | Molock et al. ............ 526/301 |
| 5,087,392 A | 2/1992 | Burke et al. .............. 264/2.7 |
| 5,120,816 A | 6/1992 | GOuld et al. ............. 528/76 |
| 5,169,720 A | 12/1992 | Braatz et al. ............. 428/423.1 |
| 5,175,229 A | 12/1992 | Braatz et al. ............. 528/48 |
| 5,283,312 A | 2/1994 | Kanemura et al. .......... 528/60 |
| 5,304,584 A | 4/1994 | Nunez et al. .............. 523/106 |
| 5,334,691 A | 8/1994 | Gould et al. .............. 528/76 |
| 5,352,758 A | 10/1994 | Kanemura et al. .......... 528/85 |
| 5,354,835 A | 10/1994 | Blair ...................... 528/59 |
| 5,506,300 A | 4/1996 | Ward et al. ............... 525/88 |
| 5,612,414 A | 3/1997 | Becker et al. ............. 525/102 |
| 5,656,210 A | 8/1997 | Hill et al. ................ 264/2.6 |
| 5,674,942 A | 10/1997 | Hill et al. ................ 525/131 |
| 5,719,227 A * | 2/1998 | Rosenberry et al. ......... 524/590 |
| 5,814,705 A | 9/1998 | Ward et al. ............... 525/88 |
| 6,096,246 A | 8/2000 | Chan et al. ............... 252/586 |
| 6,177,507 B1 | 1/2001 | Calderada ................ 524/590 |
| 6,225,021 B1 | 5/2001 | Widawski et al. ......... 430/270.1 |
| 6,252,032 B1 | 6/2001 | Van Antwerp et al. ..... 528/73 |
| 6,312,706 B1 | 11/2001 | Lai et al. ................. 424/422 |
| 6,329,488 B1 | 12/2001 | Terry et al. .............. 528/28 |
| 6,379,591 B1 | 4/2002 | Breyne ................... 252/586 |
| 6,399,791 B1 | 6/2002 | Breyne et al. ............. 549/389 |
| 6,479,587 B1 * | 11/2002 | Stockinger et al. ......... 525/131 |
| 2002/0037271 A1 | 3/2002 | Lai et al. ................. 424/78.17 |

FOREIGN PATENT DOCUMENTS

| EP | 0204161 | 5/1986 |
| EP | 735097 | 12/1993 |
| EP | 1017734 | 9/1998 |
| JP | 11255859 | 9/1999 |
| WO | WO 99/14253 | 9/1998 |

\* cited by examiner

*Primary Examiner* — Milton I Cano
*Assistant Examiner* — Michael Leonard
(74) *Attorney, Agent, or Firm* — Sheng-Hsin Hu; Jian Zhou

(57) ABSTRACT

The present invention provides a water-soluble crosslinkable polyurea prepolymer. The crosslinkable polyurea prepolymer of the invention is prepared by reacting an amine- or isocyanate-capped polyurea with a multifunctional compound having at least one one ethylenically unsaturated group and a function group coreactive with the capping amine or isocyanate groups of the amine- or isocyanate-capped polyurea. The amine- or isocyanate-capped polyurea is a copolymerization production of: (a) at least one poly(oxyalkylene)diamine, (b) optionally at least one organic di- or poly-amine, (c) optionally at least one diisocyanate, and (d) at least one polyisocyanate. The crosslinkable polyurea prepolymer of the invention can find use in economically producing contact lenses which have durable, highly elastic soft contact lenses with desired physical properties. In addition, the present invention provides method for making a medical device, preferably an ophthalmic device, more preferably a contact lens.

18 Claims, No Drawings

CROSSLINKABLE POLYUREA PREPOLYMERS

This application claims priority to U.S. Provisional Patent Application Ser. No. 60/525,100 filed Nov. 25, 2003, which application is hereby incorporated herein by reference in their entirety.

The present invention is related to radiation-curable prepolymers useful for making polymeric articles, preferably ophthalmic device, more preferably soft hydrogel contact lenses. In particular, the present invention is related to water-soluble radiation-curable prepolymers.

BACKGROUND

It is well known that contact lenses can be used for cosmetics and the correction of visual acuity. The ideal contact lens is one which is not only comfortable to wear for extended periods of time, but also easily and reproducibly manufactured at minimum cost in time and labor.

European Patent EP 0 637 490 B1 describes a process by means of which a further improvement in the production process of contact lenses from crosslinkable prepolymers, such as, for example, water-soluble crosslinkable polyvinyl alcohols described in U.S. Pat. Nos. 5,508,317, 5,583,163, 5,789,464 and 5,849,810 and water-soluble crosslinkable polyurea prepolymers described in U.S. Pat. No. 6,479,587, can be achieved. In this case, a lens-forming material (a prepolymer solution) is introduced into a mold consisting of two mold halves, the two mold halves not touching each other but having a thin gap of annular design arranged between them. The gap is connected to the mold cavity, so that excess lens forming material can flow away into the gap. The crosslinking of the lens-forming material in the mold cavity is carried out by means of actinic irradiation, in particular UV light, under spatial limitation of actinic irradiation (e.g., by means of a chromium mask). Thus, only the lens-forming material which is in the unmasked area in the mold cavity is crosslinked, whereas the lens-forming material located in the masked area (behind the mask, such as in the gap). High reproducibility of the rim shaping of the lens can be achieved without a positive connection between the two mold halves made of polypropylene or polystyrene. The uncrosslinked, shadowed prepolymer solution can easily be washed away from the dimensionally stable, crosslinked lens by using a suitable washing media (e.g. water). Instead of polypropylene or polystyrene molds that can be used only once, it is possible to use reusable quartz/glass molds or reusable plastic molds, since, following the production of a lens, these molds can be cleaned rapidly and effectively of the uncrosslinked prepolymer and other residues, using water, on account of the water-soluble basic chemistry, and can be blown dried with air. By this means, high volume molding of contact lenses with high precision and reproducibility can in particular be achieved.

Contact lenses produced from the above-described water-soluble crosslinkable prepolymers have advantageous properties such as a good compatibility with the human cornea resulting in a high wearing comfort and the absence of irritation and allergenic effects. However, contact lenses made from those water-soluble photo-crosslinkable prepolymers may not always posses combination of most desirable physical/mechanical properties, for example, such as tensile properties (stress at break, elongation at break, and modulus), water contents, biocompatibility, for the intended uses, tensile properties (stress at break, elongation at break, and modulus).

Accordingly, there is still a need for a new prepolymer for economically producing durable, highly elastic soft contact lenses with desired physical/mechanical properties.

SUMMARY OF THE INVENTION

In accomplishing the foregoing, there is provided, in accordance with one aspect of the present invention, a water-soluble crosslinkable polyurea prepolymer, which is the reaction product of an amine- or isocyanate-capped polyurea and a multifunctional compound having at least one ethylenically unsaturated group and a function group coreactive with capping amine or isocyanate groups, wherein the amine- or isocyanate-capped polyurea is a copolymerization product of a mixture comprising (a) at least one aminoalkyl polyalkylene glycol, (b) optionally at least one organic di- or poly-amine, (c) optionally at least one diisocyanate, and (d) at least one polyisocyanate.

In another aspect, the present invention provides a polymer which is a product of actinically-crosslinking of an above-described water-soluble crosslinkable prepolymer of the invention in the presence or preferably in the absence of one or more additional vinylic monomers.

In a further aspect, the present invention provides a medical device, preferably an ophthalmic device, more preferably a contact lens, which is obtained by actinically crosslinking an above-described water-soluble crosslinkable prepolymer of the invention in the presence or preferably in the absence of one or more additional vinylic monomers.

In another further aspect, the present invention provides a method for producing an ophthalmic device, the method comprising the steps of: a) introducing an above-described water-soluble crosslinkable prepolymer of the invention, which is liquid or readily meltable at room temperature, and which is essentially free from solvents, into a mold, in the presence or preferably in the absence of one or more additional vinylic monomers, and optionally in the presence of a photo-initiator, b) crosslinking by actinic radiation the water-soluble crosslinkable prepolymer, and c) opening the mold so that the article can be removed from the mold.

In a still further aspect, the present invention provides a method for producing an ophthalmic device, the method comprising the steps of: a) introducing an aqueous solution of an above-described water-soluble crosslinkable prepolymer of the invention, in the presence or preferably in the absence of one or more additional vinylic monomers, and optionally in the presence of a photo-initiator, into a mold; b) crosslinking by actinic radiation the water-soluble crosslinkable prepolymer, and c) opening the mold so that the article can be removed from the mold.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In one aspect, the present invention relates to a water-soluble crosslinkable polyurea prepolymer, which is obtained by introducing ethylenically unsaturated groups into an amine- or isocyanate-capped polyurea.

Exemplary ethylenically unsaturated groups include without limitation acryloyl, methacryloyl, allyl, vinyl, styrenyl, or other C=C containing groups.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer. Examples of actinic radiation are UV irradiation, ionized radiation (e.g. gamma ray or X-ray irradiation), microwave irradiation, and the like.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), and microwave irradiation.

In accordance with the present invention, an amine- or isocyanate-capped polyurea is a branched polyurea polymer in which each of its polymeric chains including main and side chains are terminated with one capping group which can be an primary or secondary amine group or an isocyanate group. An amine- or isocyanate-capped polyurea of the invention is a copolymerization product of a mixture comprising (a) at least one poly(oxyalkylene)diamine, (b) optionally at least one organic di- or poly-amine, (c) optionally at least one diisocyanate, and (d) at least one polyisocyanate. Preferably, the amine- or isocyanate-capped polyurea is a copolymerization product of a mixture comprising (a) at least one poly(oxyalkylene)diamine, (b) at least one organic poly-amine, (c) optionally at least one diisocyanate, and (d) at least one polyisocyanate. More preferably, the amine- or isocyanate-capped polyurea is a copolymerization product of a mixture comprising (a) at least one poly(oxyalkylene)diamine, (b) at least one organic poly-amine (preferably triamine), (c) at least one diisocyanate, and (d) at least one polyisocyanate (preferably triisocyanate).

In accordance with the present invention, a poly(oxyalkylene)diamine refers to a compound of formula $$CG-(R_1-O)_n-(R_2-O)_m-(R_3-O)_p-CG' \qquad (1)$$

wherein CG and CG' independently of each other are a primary or secondary amino (amine) group, or an amino-$C_1$-$C_{12}$ alkyl, $R_1$, $R_2$, and $R_3$, independently of one other, are each linear or branched $C_2$-$C_4$-alkylene or hydroxy-substituted $C_2$-$C_8$ alkylene radical, and n, m and p, independently of one another, are each a number from 0 to 500, wherein the sum of (n+m+p) is 5 to 1000. The sum of (n+m+p) is preferably from 8 to 200, more preferably from 8 to 100. Examples of preferred compounds of formula (i) include the family of polyoxyalkyleneamines with various average molecular weights, e.g. so-called Jeffamines® having an average molecular weight of, for example, approximately from 200 to 5000.

In accordance with the present invention, a diisocyanate can be a linear or branched $C_3$-$C_{24}$ aliphatic diisocyanate, a $C_5$-$C_{24}$ cycloaliphatic or aliphatic-cycloaliphatic diisocyanate, or a $C_6$-$C_{24}$ aromatic or araliphatic diisocyanate. Examples of diisocyanates include methylene dicyclohexyl diisocyanate, hexamethylene diisocyanate, isophorone diisocyanate, toluene-2,4-diisocyanate, toluene-2,6-diisocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3"-diphenyl-4,4"-biphenylene diisocyanate, 4,4"-biphenylene diisocyanate, 4,4"-diphenylmethane diisocyanate, 3,3"-dichloro-4,4"-biphen-ylene diisocyanate, 1,6-hexamethylene diisocyanate, 1,4-tetramethylene diisocyanate, 1,10-decamethylene diisocyanate, cumene-2,4-diisocyanate, 1,5-napthalene diisocyanate, 1,4-cyclohexylene diisocyanate, p-tetramethyl xylylene diisocyanate, p-phenylene diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4-dimethyl-1,3-phenylene diisocyanate, 5,6-dimethyl-1,3-phenylene diisocyanate, 2,4-diisocyanatodiphenylether, 4,4'-diisocyanatodiphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane-, 2,6-dimethyl-4,4'-diisocyanatodiphenyl, 2,4-diisocyanatostilbene, 3,3'-dimethoxy-4,4'-diisocyanatodiphenyl, 1,4-anthracenediisocyanate, 2,5-fluorenediisocyanate, 1,8-naphthalene diisocyanate, 2,6-diisocyanatobenzfuran, polymeric 4,4'-diphenylmethane diisocyanate, xylylene diisocyanate, and m-tetramethyl xylylene diisocyanate. Examples of especially preferred diisocyanates of formula (3) are isophorone diisocyanate (IPDI), 4,4'-methylenebis (cyclohexyl isocyanate), toluoylene-2,4-diisocyanate (TDI), 1,6-diisocyanato-2,2,4-trimethyl-n-hexane (TMDI), methylenebis-(cyclohexyl-4-isocyanate), methylenebis(phenyl-isocyanate) or hexamethylene-diisocyanate (HMDI).

The component (c) can be absent or preferably present in the reaction mixture for preparing an amine- or isocyanate-capped polyurea. Where the component (c) is present, it comprise at least one organic diisocyanate selected from the group of diisocyanates listed above.

In accordance with the present invention, an organic diamine is a compound with two amino groups (primary and/or secondary). An organic diamine of the invention can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or araliphatic diamine. A preferred organic diamine is bis(hydroxyethylene)ethylenediamine (BHEEDA).

In accordance with the present invention, an organic polyamine is a compound of formula

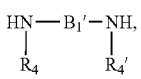

(2)

wherein $R_4$ and $R_4'$ independently of each other are hydrogen or unsubstituted or substituted $C_1$-$C_6$ alkyl or together are a direct, ring-forming bond, and $B_1'$ is a bivalent aliphatic, cycloaliphatic, aliphatic-cycloaliphatic, aromatic or araliphatic hydrocarbon radical that is interrupted by at least one amine group (—NH—) or has at least one primary or secondary amine group.

Each of $R_4$ and $R_4'$ independently of the other is hydrogen, unsubstituted $C_1$-$C_6$alkyl, hydroxy-substituted $C_1$-$C_6$alkyl or $C_1$-$C_4$alkoxy-substituted $C_1$-$C_6$alkyl. Each of $R_1$ and $R_1'$ independently of the other is preferably hydrogen, unsubstituted $C_1$-$C_6$alkyl, or hydroxy-substituted $C_1$-$C_4$alkyl, more preferably hydrogen, $C_1$-$C_2$alkyl or hydroxy-$C_1$-$C_2$alkyl, and most preferably hydrogen. The radicals $R_4$ and $R_4'$ may be different or, preferably, identical.

The radical $B_1'$ may be, for example, linear or branched $C_3$-$C_{24}$alkylene or unsubstituted or $C_1$-$C_4$alkyl-substituted $C_6$-$C_{10}$arylene, $C_7$-$C_{18}$aralkylene, $C_6$-$C_{10}$arylene-$C_1$-$C_2$alkylene-$C_6$-$C_{10}$arylene, $C_3$-$C_8$cycloalkylene, $C_3$-$C_8$cycloalkylene-$C_1$-$C_6$alkylene, $C_3$-$C_8$cycloalkylene-$C_1$-$C_2$alkylene-$C_3$-$C_8$cycloalkylene or $C_1$-$C_6$alkylene-$C_3$-$C_8$cycloalkylene-$C_1$-$C_6$alkylene, each of which is interrupted by at least one, preferably from 1 to 3, more preferably 1 or 2 groups of —NH—.

Examples of polyamines of formula (2) are symmetrical or asymmetrical dialkylenetriamines or trialkylenetetramines. Preferred polyamines include without limitation diethylenetriamine, N-2'-aminoethyl-1,3-propylenediamine, N,N-bis (3-aminopropyl)-amine, N,N-bis(6-aminohexyl)amine and triethylenetetramine.

The component (b) can be absent or preferably present in the reaction mixture for preparing an amine- or isocyanate-capped polyurea. Where the component (b) is present, it comprise preferably at least one organic polyamine and optionally an organic diamine, more preferably at least one triamine and optionally an organic diamine.

In accordance with the present invention, a polyisocyanate is a compound comprising at least three isocyanate groups. A polyisocyanate can be a linear or branched $C_3$-$C_{24}$ aliphatic polyisocyanate, a $C_5$-$C_{45}$ cycloaliphatic or aliphatic-cycloaliphatic polyisocyanate, or a $C_6$-$C_{24}$ aromatic or araliphatic polyisocyanate. Preferably, a polyisocyanate is a $C_6$-$C_{45}$ cycloaliphatic or aliphatic-cycloaliphatic compound containing 3-6 isocyanate groups and at least one heteroatom selected from the group consisting of oxygen and nitrogen. More preferably, a polyisocyanate is a compound having a group of formula (3):

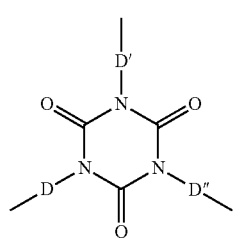

(3)

wherein D, D' and D" independent of one another are a linear or branched divalent $C_1$-$C_{12}$ alkyl radical, a divalent $C_5$-$C_{14}$ alkylcycloalkyl radical.

In a preferred embodiment, a polyisocyanate is a triisocyanate. Examples of preferred triisocyanates include without limitation the isocyanurate trimer of hexamethylene diisocyanate, 2,4,6-toluene triisocyanate, p,p',p"-triphenylmethane triisocyanate, and the trifunctional trimer (isocyanurate) of isophorone diisocyanate.

Ethylenically unsaturated groups can be introduced into an amine- or isocyanate-capped polyurea by reacting it with a multifunctional compound having at least one ethylenically unsaturated group and a function group coreactive with capping amine or isocyanate groups, according to any methods known to a person skilled in the art.

It is advantageous that the amine- or isocyanate-capped polyurea is an amine-capped polyurea which may allow the second step reaction to be carried out in an aqueous medium.

One embodiment of a crosslinkable prepolymer of the invention is illustrated in formula (4)

$$CP-(Q)_q \qquad (4)$$

wherein q is an integer of $\geq 3$, Q is an organic radical that comprises at least one crosslinkable group, CP is a multivalent branched copolymer fragment comprising segments A and U and optionally segments B and/or T, wherein:
A is a bivalent radical of formula

(5), wherein $A_1$ is the bivalent radical of —$(R_1$—$O)_n$—$(R_2$—$O)_m$—$(R_3$—$O)_p$—, a linear or branched $C_2$-$C_{24}$ aliphatic bivalent radical, a $C_5$-$C_{24}$ cycloaliphatic or aliphatic-cycloaliphatic bivalent radical, or a $C_6$-$C_{24}$ aromatic or araliphatic bivalent radical, $R_1$, $R_2$, $R_3$, n, m, and p each are defined above, and $R_A$ and $R_A'$ independently of each other is hydrogen, an unsubstituted $C_1$-$C_6$alkyl, a substituted $C_1$-$C_6$alkyl, or a direct, ring-forming bond;
T is a bivalent radical of formula

(6)

wherein $R_T$ is a bivalent aliphatic, cycloaliphatic, aliphatic-cycloaliphatic, aromatic, araliphatic or aliphatic-heterocyclic radical;
U is a trivalent radical of formula

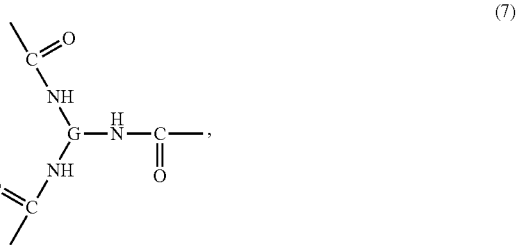

(7)

wherein G is a linear or branched $C_3$-$C_{24}$ aliphatic trivalent radical, a $C_5$-$C_{45}$ cycloaliphatic or aliphatic-cycloaliphatic trivalent radical, or a $C_3$-$C_{24}$ aromatic or araliphatic trivalent radical;
B is a radical of formula

(8), wherein $R_B$ and $R_B'$ independently of each other is hydrogen, an unsubstituted $C_1$-$C_6$alkyl, a substituted $C_1$-$C_6$alkyl, or a direct, ring-forming bond, $B_1$ is a bivalent aliphatic, cycloaliphatic, aliphatic-cycloaliphatic, aromatic or araliphatic hydrocarbon radical that has at least one primary or secondary amine group or is interrupted by at least one amine group —$NR_m$— in which $R_m$ is hydrogen, a radical Q mentioned above or a radical of formula

Q—CP'— (9), wherein Q is as defined above, and CP' is a bivalent copolymer fragment comprising at least two of the above-mentioned segments A, T, U and B; provided that in the copolymer fragments CP and CP' a segment A or B is followed by a segment T or U in each case; provided that in the copolymer fragments CP and CP' a segment T or U is followed by a segment A or B in each case; provided that the radical Q in formulae (4) and (9) is bonded to a segment A or B in each case; and provided that the N atom of —$NR_m$— is bonded to a segment T or U when $R_m$ is a radical of formula (9).

Q is, for example, an olefinically unsaturated, copolymerisable radical that is bonded to the N atom of —$NR_A$—, —$NR_A'$—, —$NR_B$—, or —$NR_B'$—, in a suitable manner, for example directly, by way of a functional group or by way of a bridge member, or that together with —$NR_A$—, —$NR_A'$—, —$NR_B$—, or —$NR_B'$—, forms a cyclic ring; in the latter case, $R_A$, $R_A'$, $R_B$, or $R_B'$ is a direct, ring-forming bond.

The radical Q corresponds, for example, to a radical $R_5$ mentioned hereinbelow or to a radical of formula

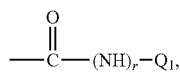   (10)

wherein $Q_1$ is, for example, a radical of formula

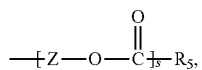   (10a)

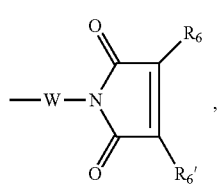   (10b)

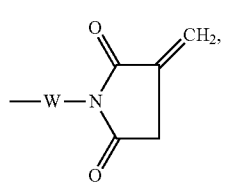   (10c)

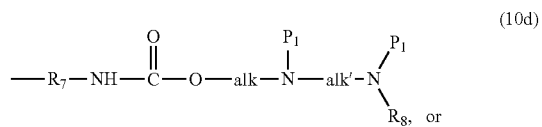   (10d)

   (10e)

and wherein
Z is linear or branched $C_2$-$C_{12}$alkylene,
$R_5$ is an olefinically unsaturated copolymerisable radical having from 2 to 24 carbon atoms which may be further substituted,
W is a $C_2$-$C_{12}$alkylene radical, phenylene radical or $C_7$-$C_{12}$aralkylene radical,
each of $R_6$ and $R_6'$ independently of each other is hydrogen, $C_1$-$C_4$alkyl or halogen,
$R_7$ is a bivalent aliphatic, cycloaliphatic, aliphatic-cycloaliphatic, aromatic or araliphatic hydrocarbon radical,
$R_8$ is hydrogen or $C_1$-$C_4$alkyl,
each of alk and alk' independently of the other is a linear or branched $C_1$-$C_{12}$alkylene radical, each of r and s independently of each other is the number 0 or 1,
Z" is $C_1$-$C_6$alkylene and
$P_1$ and $P_1'$ independently of each other are a radical of the above-mentioned formula (10) wherein $Q_1$ is a radical of the above formula (10a), (10b), (10c) or (10e).

Z is preferably linear or branched $C_2$-$C_8$alkylene, more preferably linear $C_2$-$C_6$alkylene and most preferably linear $C_2$-$C_4$alkylene. In a preferred embodiment of the invention, Z is 1,3-propylene or, especially, 1,2-ethylene.

Suitable substituents on the olefinic $C_2$-$C_{24}$ radical $R_5$ are, for example, $C_1$-$C_4$alkoxy, halogen, phenyl or carboxy.

$R_5$ is, for example, a radical of formula

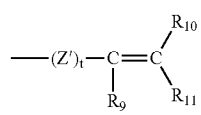   (11)

wherein t is the number 0 or 1,
$R_9$ is hydrogen, $C_1$-$C_4$alkyl or halogen,
each of $R_{10}$ and $R_{11}$ independently of the other is hydrogen, $C_1$-$C_4$alkyl, phenyl, carboxy or halogen, and
Z' is linear or branched $C_1$-$C_{12}$alkylene or unsubstituted or $C_1$-$C_4$alkyl- or $C_1$-$C_4$alkoxy-substituted phenylene or $C_7$-$C_{12}$aralkylene.

When Z' is a phenylene radical, it is, for example, unsubstituted or methyl- or methoxy-substituted 1,2-, 1,3- or 1,4-phenylene. Preferably, Z' as a phenylene radical is 1,3- or 1,4-phenylene.

When Z' is an aralkylene radical, it is, for example, unsubstituted or methyl- or methoxy-substituted benzylene, wherein the methylene group is bonded to the amine nitrogen in each case. Preferably, Z' as an aralkylene radical is the 1,3- or 1,4-phenylenemethylene radical, wherein the methylene group is bonded to the amine nitrogen —NH— in each case.

Z' is preferably unsubstituted or methyl- or methoxy-substituted phenylene or phenylenemethylene or $C_1$-$C_{12}$alkylene, more preferably 1,3- or 1,4-phenylene or $C_1$-$C_6$alkylene, especially $C_1$-$C_2$alkylene and most preferably methylene.

t is the number 1 or, preferably, the number 0.

$R_9$ is preferably hydrogen, methyl or chlorine and most preferably hydrogen or methyl.

Each of $R_{10}$ and $R_{11}$ independently of the other is preferably hydrogen, carboxy, chlorine, methyl or phenyl. In a preferred embodiment of the invention, $R_{10}$ is hydrogen, chlorine, methyl or phenyl and $R_{11}$ is hydrogen or carboxy. Most preferably, $R_{10}$ and $R_{11}$ are each hydrogen.

Examples of suitable radicals $R_5$ are vinyl, 2-propenyl, allyl, 2-butenyl, o-, m- or p-vinylphenyl, styryl, 2-carboxyvinyl, 2-chloro-2-carboxyvinyl, 1,2-dichloro-2-carboxyvinyl, 1,2-dimethyl-2-carboxyvinyl and 2-methyl-2-carboxyvinyl.

Especially preferred radicals $R_5$ correspond to formula (11) wherein t is 0, $R_9$ is hydrogen or methyl, $R_{10}$ is hydrogen, methyl, chlorine or phenyl and $R_{11}$ is hydrogen or carboxy.

Other especially preferred radicals $R_5$ correspond to the above formula (11) wherein t is 1, Z' is 1,3- or 1,4-phenylene or $C_1$-$C_6$alkylene, especially $C_1$-$C_2$alkylene, $R_9$ is hydrogen or methyl and $R_{10}$ and $R_{11}$ are each hydrogen.

Z" is preferably $C_1$-$C_4$alkylene, especially methylene or 1,1-dimethylmethylene.

One group of suitable radicals Q corresponds to the above formula (10) wherein r is 0 and $Q_1$ is a radical of the above formula (10a) wherein s is 0 and for $R_5$ the meanings and preferences given above apply.

A second group of suitable radicals Q corresponds to the above formula (10) wherein r is 1 and $Q_1$ is a radical of the above formula (10a) wherein s is 0 and for $R_5$ and Z the meanings and preferences given above apply.

A further group of suitable radicals Q corresponds to the above formula (10) wherein r is 1 and $Q_1$ is a radical of the above formula (10a) wherein s is 1 and for $R_5$ and Z the meanings and preferences given above apply.

A further group of suitable radicals Q corresponds to the above formula (10) wherein r is 0 and $Q_1$ is a radical of the above formula (10e) wherein for $R_5$ and Z" the meanings and preferences given above apply.

In formulae (10b) and (10c), W is preferably a $C_2$-$C_6$alkylene radical or a 1,3- or 1,4-phenylene radical and most preferably a $C_2$-$C_3$alkylene radical. Each of $R_6$ and $R_6'$ independently of the other is preferably hydrogen, methyl or chlorine. Most preferably, each of $R_6$ and $R_6'$ independently of the other is hydrogen or methyl.

In formula (10d), $R_7$ is, for example, linear or branched $C_3$-$C_{18}$alkylene or unsubstituted or $C_1$-$C_4$alkyl- or $C_1$-$C_4$alkoxy-substituted $C_6$-$C_{10}$arylene, $C_7$-$C_{10}$aralkylene, $C_6$-$C_{10}$arylene-$C_1$-$C_2$alkylene-$C_6$-$C_{10}$arylene, $C_3$-$C_6$cycloalkylene, $C_3$-$C_6$cycloalkylene-$C_1$-$C_6$alkylene, $C_3$-$C_6$cycloalkylene-$C_1$-$C_2$alkylene-$C_3$-$C_6$cycloalkylene, $C_1$-$C_6$alkylene-$C_3$-$C_6$cycloalkylene-$C_1$-$C_6$alkylene or an aliphatic-heterocyclic radical comprising at least one hydantoin group.

$R_7$ as alkylene is preferably a linear or branched $C_3$-$C_{14}$alkylene radical, more preferably a linear or branched $C_4$-$C_{12}$alkylene radical and most preferably a linear or branched $C_6$-$C_{10}$alkylene radical. Some preferred alkylene radicals are 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 1,8-octylene, 2,2-dimethyl-1,8-octylene and 2,2,3- or 2,2,4- or 2,2,5- or 2,2,6- or 2,2,7-trimethyl-1,8-octylene.

When $R_7$ is arylene, it is, for example, naphthylene or especially phenylene, each of which may be substituted, for example, by $C_1$-$C_4$alkyl or by $C_1$-$C_4$alkoxy. Preferably, $R_7$ as arylene is 1,3- or 1,4-phenylene that is substituted by $C_1$-$C_4$alkyl or by $C_1$-$C_4$alkoxy in the ortho-position to at least one linkage site. Examples of substituted arylene are 1-methyl-2,4-phenylene, 1,5-dimethyl-2,4-phenylene, 1-methoxy-2,4-phenylene and 1-methyl-2,7-naphthylene.

$R_7$ as aralkylene is preferably naphthylalkylene and most preferably phenylalkylene. The alkylene group in aralkylene contains preferably from 1 to 12, more preferably from 1 to 6 and most preferably from 1 to 4 carbon atoms. Most preferably, the alkylene group in aralkylene is methylene or ethylene. Some examples are 1,3- or 1,4-benzylene, naphth-2-yl-7-methylene, 6-methyl-1,3- or -1,4-benzylene and 6-methoxy-1,3- or -1,4-benzylene.

When $R_7$ is cycloalkylene, it is preferably $C_5$-$C_6$cycloalkylene and most preferably cyclohexylene that is unsubstituted or substituted by methyl. Some examples are 1,3-cyclo-butylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1,3-cyclohexylene, 3-methyl- or 3,3-dimethyl-1,4-cyclohexylene, 3,5-dimethyl-1,3-cyclohexylene and 2,4-dimethyl-1,4-cyclohexylene.

When $R_7$ is cycloalkylene-alkylene, it is preferably cyclopentylene-$C_1$-$C_4$alkylene and especially cyclohexylene-$C_1$-$C_4$alkylene, each unsubstituted or mono- or poly-substituted by $C_1$-$C_4$alkyl, especially methyl. More preferably, the group cycloalkylene-alkylene is cyclo-hexylene-ethylene and, most preferably, cyclohexylene-methylene, each unsubstituted or substituted in the cyclohexylene radical by from 1 to 3 methyl groups. Some examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or -4-methylene, 3- or 4- or 5-methyl-cyclohex-1-yl-3- or -4-methylene, 3,4- or 3,5-dimethyl-cyclohex-1-yl-3- or -4-methylene and 3,4,5- or 3,4,4- or 3,5,5-trimethyl-cyclohex-1-yl-3- or -4-methylene.

When $R_7$ is alkylene-cycloalkylene-alkylene, it is preferably $C_1$-$C_4$alkylene-cyclopentylene-$C_1$-$C_4$alkylene and especially $C_1$-$C_4$alkylene-cyclohexylene-$C_1$-$C_4$alkylene, each unsubstituted or mono- or poly-substituted by $C_1$-$C_4$alkyl, especially methyl. More preferably, the group alkylene-cycloalkylene-alkylene is ethylene-cyclohexylene-ethylene and, most preferably, is methylene-cyclohexylene-methylene, each unsubstituted or substituted in the cyclohexylene radical by from 1 to 3 methyl groups. Some examples are cyclopentane-1,3-dimethylene, 3-methyl-cyclopentane-1,3-dimethylene, 3,4-dimethyl-cyclopentane-1, 3-dimethylene, 3,4,4-trimethyl-cyclopentane-1,3-dimethylene, cyclohexane-1,3- or -1,4-dimethylene, 3- or 4- or 5-methyl-cyclohexane-1,3- or -1,4-dimethylene, 3,4- or 3,5-dimethyl-cyclohexane-1,3- or -1,4-dimethylene, 3,4,5- or 3,4,4- or 3,5,5-trimethyl-cyclohexane-1,3- or -1,4-dimethylene.

$R_7$ as $C_3$-$C_8$cycloalkylene-$C_1$-$C_2$alkylene-$C_3$-$C_8$cycloalkylene or $C_6$-$C_{10}$arylene-$C_1$-$C_2$alkylene-$C_6$-$C_{10}$arylene is preferably $C_5$-$C_6$cycloalkylene-methylene-$C_5$-$C_6$cycloalkylene or phenylene-methylene-phenylene, each of which may be unsubstituted or substituted in the cycloalkyl or phenyl ring by one or more methyl groups.

When $R_7$ is an aliphatic-heterocyclic radical containing hydantoin groups, it may correspond, for example, to formula

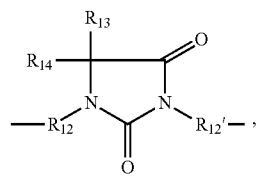

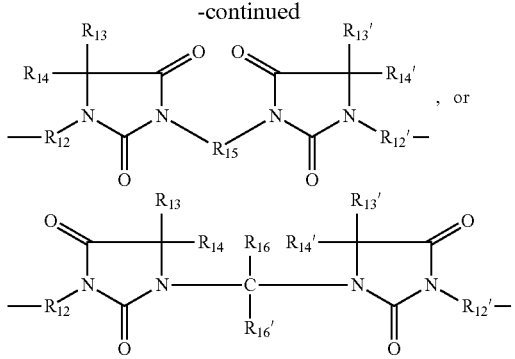

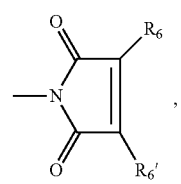

wherein $R_{12}$ and $R_{12}'$ are each $C_1$-$C_6$alkylene, preferably $C_2$-$C_4$alkylene and especially $C_2$-$C_3$alkylene, $R_{13}$, $R_{13}'$, $R_{14}$ and $R_{14}'$ are each independently of the others hydrogen, $C_1$-$C_6$alkyl or $C_5$-$C_7$cycloalkyl, preferably are each independently of the others hydrogen or $C_1$-$C_4$alkyl and especially are each methyl, $R_{15}$ is $C_1$-$C_{12}$alkylene and preferably $C_1$-$C_6$-alkylene and $R_{16}$ and $R_{16}'$ are each independently of the other hydrogen or $C_1$-$C_4$alkyl and preferably hydrogen or methyl.

The radical $R_7$ in formula (10d) has a symmetrical or, preferably, an asymmetrical structure.

A preferred group of radicals $Q_1$ of formula (10d) comprises those wherein $R_7$ is linear or branched $C_6$-$C_{10}$alkylene; cyclohexylene-methylene or cyclohexylene-methylene-cyclo-hexylene each unsubstituted or substituted in the cyclohexyl moiety by from 1 to 3 methyl groups; or phenylene or phenylene-methylene-phenylene each unsubstituted or substituted in the phenyl moiety by methyl.

The bivalent radical $R_7$ is derived preferably from a diisocyanate and most preferably from a diisocyanate selected from the group isophorone diisocyanate (IPDI), toluoylene-2,4-diisocyanate (TDI), 4,4'-methylenebis(cyclohexyl isocyanate), 1,6-diisocyanato-2,2,4-trimethyl-n-hexane (TMDI), methylenebis(phenyl isocyanate), methylenebis(cyclohexyl-4-isocyanate) and hexamethylene diisocyanate (HMDI).

Each of the radicals alk and alk' independently of the other is preferably a $C_2$-$C_8$alkylene radical, more preferably a $C_2$-$C_4$alkylene radical and most preferably the 1,2-ethylene radical.

$R_8$ is preferably methyl or especially hydrogen.

$P_1$ is a radical of the above formula (10) wherein $Q_1$ is a radical of the above formula (10a), (10b) or (10c), and wherein for the variables contained therein the meanings and preferences given above apply in each case.

$P_1$ is preferably a radical of the above formula (10) wherein $Q_1$ is a radical of the above formula (10a), and most preferably is a radical of formula (10') or (10''') given below.

When Q is a radical $R_5$, the meaning and preferences given above for $R_5$ apply in each case.

When Q together with —NR—, —NR'—, forms a cyclic ring comprising at least one crosslinkable group, it is in each case, for example, a radical of formula

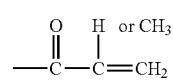

wherein each of $R_6$ and $R_6'$ is as defined above and preferably each is methyl.

Especially preferred radicals Q correspond to formula

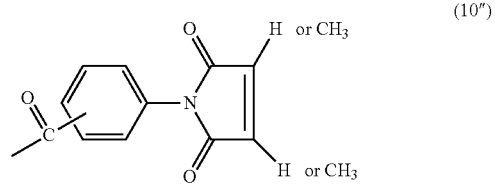

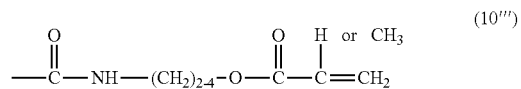

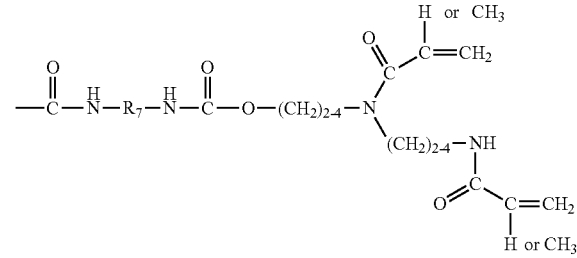

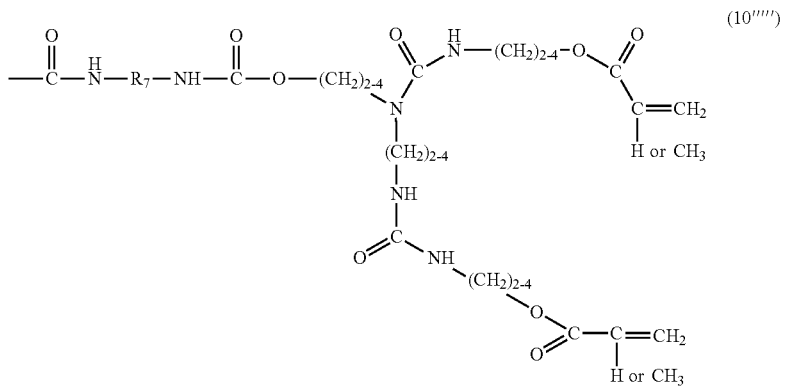

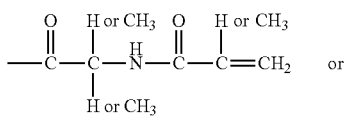

(10*)

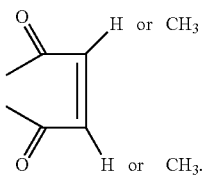

(10b''')

wherein for $R_7$ the meanings and preferences given above apply in each case.

Especially preferred as the radical Q are radicals of formula (10') and (10''').

Each of $R_A$, $R_A'$, $R_B$, and $R_B'$ independently of others is, for example, hydrogen or unsubstituted or, for example, hydroxy- or $C_1$-$C_4$alkoxy-substituted $C_1$-$C_6$alkyl, preferably hydrogen or unsubstituted or hydroxy-substituted $C_1$-$C_4$alkyl, more preferably hydrogen, $C_1$-$C_2$alkyl or hydroxy-$C_1$-$C_2$alkyl and most preferably hydrogen. The radicals $R_A$, $R_A'$, $R_B$, and $R_B'$ may be different or, preferably, identical.

The bivalent radical $A_1$ preferably is the bivalent radical of —(R1-O)n-(R2-O)m-(R3-O)p-, wherein $R_1$, $R_2$, and $R_3$, independently of one other, are each linear or branched $C_2$-$C_4$-alkylene or hydroxy-substituted $C_2$-$C_8$ alkylene radical, and n, m and p, independently of one another, are each a number from 0 to 500, wherein the sum of (n+m+p) is 5 to 1000. The sum of (n+m+p) is preferably 8 to 200, more preferably from 8 to 100. $A_1$ is derived preferably bis-aminoalkylene-polyalkylene glycols of various average molecular weights.

The prepolymers of the invention may have uniform segments A or, alternatively, two or more structurally different segments A, for example 2 or 3 or, preferably, 2 different segments A.

With regard to the segments T of formula (6) according to the invention, for $R_T$ the meanings and preferences given above for $R_5$ apply. Accordingly, in a preferred embodiment of the invention, $R_T$ is derived from an aliphatic, cycloaliphatic, aliphatic-cycloaliphatic, aromatic or araliphatic diisocyanate, especially from a diisocyanate selected from the group isophorone diisocyanate (IPDI), toluoylene-2,4-diisocyanate (TDI), methylenebis(cyclohexyl isocyanate), 1,6-diisocyanato-2,2,4-trimethyl-n-hexane (TMDI), methylenebis(phenyl isocyanate), methylenebis(cyclohexyl isocyanate) and hexamethylene diisocyanate (HMDI).

The prepolymers of the invention may not have segments T but preferably have uniform segments T or, alternatively, two or more structurally different segments T. Preferably, the prepolymers contain uniform segments T.

The radical $B_1$ may be, for example, linear or branched $C_3$-$C_{24}$alkylene or unsubstituted or $C_1$-$C_4$alkyl-substituted $C_6$-$C_{10}$arylene, $C_2$-$C_{18}$aralkylene, $C_6$-$C_{10}$arylene-$C_1$-$C_2$alkylene-$C_6$-$C_{10}$arylene, $C_3$-$C_8$cycloalkylene, $C_3$-$C_8$cycloalkylene-$C_1$-$C_6$alkylene, $C_3$-$C_8$cycloalkylene-$C_1$-$C_2$alkylene-$C_3$-$C_8$cycloalkylene or $C_1$-$C_6$alkylene-$C_3$-$C_8$cycloalkylene-$C_1$-$C_6$alkylene, each of which is interrupted by at least one group of formula —$NR_m$—, preferably by from 1 to 3 or especially 1 or 2 identical or different groups of formula —$NR_m$—, more preferably by 1 or 2 identical groups of formula —$NR_m$—, or most preferably by 1 group of formula —$NR_m$—.

Preferably, the radical $B_1$ is a linear or branched $C_4$-$C_{24}$alkylene radical that is interrupted by from 1 to 3 groups, preferably 1 or 2 groups and especially by one group of formula —$NR_m$—.

Especially preferred as the radical $B_1$ is linear or branched alkylene having from 3 to 14 or especially from 4 to 12 carbon atoms that is interrupted by one group of formula —$NR_m$—.

When $R_m$ is a radical Q or a radical of formula (9), then, for the segments A, B, T and U contained therein and for the variable Q, the meanings, preferences and conditions given above apply in each case.

One group of preferred radicals $B_1$ corresponds to formula

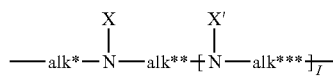

(12)

wherein each of alk*, alk and alk* independently of the others is a $C_2$-$C_{12}$alkylene radical, preferably a $C_2$-$C_6$alkylene radical and most preferably a $C_2$-$C_4$alkylene radical; I is the number 0 or 1 and especially the number 0 and for $R_m$ and $R_m'$ independently the meanings and preferences given above for $R_m$ apply in each case.

The prepolymers according to the invention may mot have segments B, but preferably have uniform segments B or, alternatively, two or more structurally different segments B. More preferably, the prepolymers contain one or more different segments B of formula

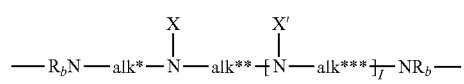

(12a)

wherein for $R_b$, $R_b'$, $R_m$, $R_m'$, alk*, alk, alk* and I the meanings and preferences given above apply in each case. When the prepolymers contain different segments B, they are preferably in the form of a mixture of 2, 3 or more different segments of the above formula (12a) that are identical with regard to $R_b$, $R_b'$, alk*, alk, alk* and I but differ with regard to the variables $R_m$ and/or $R_m'$. One example is a mixture of two or more different segments of formula (12a) wherein I is 0 in each case, $R_b$, $R_b'$, alk* and alk** are in each case identical and have one of the meanings given above, and wherein $R_m$ in the different segments has in each case a meaning that differs from the others, selected from the group consisting of radical —CP', radical -Q and hydrogen.

Alternatively, there also come into consideration, for example, different segments B that differ with regard to alk*, alk**, $R_1$ and/or $R_1'$.

The trivalent radical G may be a linear or branched $C_3$-$C_{24}$ aliphatic trivalent radical, a $C_5$-$C_{45}$ cycloaliphatic or aliphatic-cycloaliphatic trivalent radical, or a $C_6$-$C_{24}$ aromatic or araliphatic trivalent radical. Preferably, the trivalent radical G is a $C_6$-$C_{45}$ cycloaliphatic or aliphatic-cycloaliphatic trivalent radical containing at least one heteroatom selected from the group consisting of oxygen and nitrogen. More preferably, the trivalent radical G is a trivalent radical of formula (3).

The trivalent radical G is derived preferably from a triisocyanate selected from the group consisting of the isocyanurate trimer of hexamethylene diisocyanate, 2,4,6-toluene triisocyanate, p,p',p"-triphenylmethane triisocyanate, and the trifunctional trimer (isocyanurate) of isophorone diisocyanate.

The prepolymers of the invention may have uniform segments U or, alternatively, two or more structurally different segments U. Preferably, the prepolymers contain uniform segments U.

Where segments B are present, the number of segments A in the polymer fragments CP and CP' is preferably greater than the number of segments B. The number of segments A and B in the polymer fragments CP and CP' is preferably in a ratio of 1:0.01 to 1:0.5, preferably 1:0.05 to 1:0.4 and most preferably 1:0.1 to 1:0.25.

The average molecular weight of the polymer fragments CP is, for example, in a range of approximately from 350 to 25 000, preferably from 500 to 15000 and most preferably from 1000 to 10000.

In a preferred embodiment of the invention, the polymer fragment CP is terminated on both sides by a segment A. It is furthermore preferred that any polymer fragments CP' that are present are also terminated by a segment A.

A crosslinkable polyurea prepolymer of the invention can be prepared in a manner known to person skilled in the art, for example in a two-step process. In the first step, an amine- or isocyanate-capped polyurea of the invention is prepared by reacting together a mixture comprising (a) at least one poly (oxyalkylene)diamine, (b) at least one organic di- or polyamine, (c) at least one diisocyanate, and (d) at least one polyisocyanate. In the second step, a multifunctional compound having at least one ethylenically unsaturated group and a function group coreactive with the capping amine or isocyanate groups of the amine- or isocyanate-capped polyurea obtained in the first step.

The first step reaction is advantageously carried out in an aqueous or aqueous-organic medium or organic solvent (e.g, ethyllactate, THF, isopropanol, or the like). A suitable medium has been found to be especially a mixture of water and a readily water-soluble organic solvent, e.g. an alkanol, such as methanol, ethanol or isopropanol, a cyclic ether, such as tetrahydrofuran (THF), or a ketone, such as acetone. An especially suitable reaction medium is a mixture of water and a readily water-soluble solvent having a boiling point of from 50 to 85° C., preferably from 50 to 70° C., especially a water/tetrahydrofuran or a water/acetone mixture.

The reaction temperature in the first reaction step of the process is, for example, from −20 to 85° C., preferably from −10 to 50° C. and most preferably from −5 to 30° C.

The reaction times in the first reaction step of the process may vary within wide limits, a time of approximately from 1 to 10 hours, preferably from 2 to 8 hours and most preferably 2 to 3 hours having proved practicable.

In accordance with a preferred embodiment of the invention, the stoichiometry in the reaction of the components (a), (b), (c) and (d) is advantageously selected in a way such that the number of equivalents of the amino groups contained in the components (a) and (b) is greater than the number of equivalents of the isocyanato groups contained in the components (c) and (d). For example, the number of equivalents of the amine groups in the components (a) and (b) is from 1 to 50, preferably from 1.1 to 20, more preferably from 1.1 to 5 and most preferably from 1.1 to 3 folds of the number of equivalents of the isocyanato groups in the components (c) and (d).

It is furthermore preferred that the component (a) is used in excess in relation to the component (b) if the component (b) is preferably present. A ratio in equivalents of the component (a) to the component (b) of from 1:0.01 to 1:0.5, preferably from 1:0.05 to 1:0.4 and most preferably from 1:0.1 to 1:0.3 has proved especially advantageous.

If, as is preferred, the component (b) is a triamine, a ratio in equivalents of the component (a) is from 1:0.02 to 1:0.5, preferably from 1:0.05 to 1:0.4 and most preferably from 1:0.1 to 1:0.3, to the component (b); from 1:0.7 to 1:1.6, preferably from 1:0.85 to 1:1.35, more preferably from 1:0.9 to 1:1.2, to the component (c); from 1:0.01 to 1:0.7, preferably from 1:0.05 to 1:0.6, more preferably from 1:0.1 to 1:0.4, to the component (d).

Once the reaction of components (a) and (b) with components (c) and (d) is completed, the obtained amine- or isocyanate-capped polyurea can be reacted directly with a multifunctional compound having at least one ethylenically unsaturated group and a function group coreactive with the capping amine or isocyanate groups of the amine- or isocyanate-capped polyurea, to prepare a crosslinkable polyurea prepolymer of the invention. Optionally, the obtained amine- or isocyanate-capped polyurea can be purified before reacting with the multifunctional compound.

The isolation and purification of the amine- or isocyanate-capped polyurea obtained in the first reaction step and/or the crosslinkable polyurea prepolymer obtained in the second reaction step can be carried out according to known processes, for example extraction, crystallization, re-crystallization, ultrafiltration or by chromatographic purification methods.

The prepolymers according to the invention are radiation-curable, but uncrosslinked or at least substantially uncrosslinked; nevertheless, they are stable, i.e. spontaneous crosslinking due to homopolymerization does not take place substantially. The term "radiation-curable" in reference to a prepolymer means that the prepolymer can be crosslinked or polymerized by actinic radiation, including, for example, UV radiation, ionizing radiation such gamma radiation or X-rays, microwave, and the like.

The radiation-curable prepolymers are advantageously liquid or readily meltable or water-soluble; the radiation-curable prepolymers are most preferably water-soluble. The average molecular weight of the radiation-curable prepolymers according to the invention may vary within a broad range. An average molecular weight of e.g. 1000 to 50,000 has proved to be advantageous for the radiation-curable prepolymers according to the invention.

Furthermore, the radiation-curable prepolymers according to the invention may be purified in a manner known per se, for example by precipitation with acetone, dialysis or preferably by ultrafiltration. As a result of this purification procedure, the radiation-curable prepolymers according to the invention may be obtained in extremely pure form, e.g. as solvent-free liquids or melts or as concentrated aqueous solutions, which are free from or at least substantially free from reaction products such as salts, and from starting materials or other non-polymeric constituents.

The preferred purifying process for the prepolymers according to the invention, ultrafiltration, may be carried out in a manner known per se. Thus, it is possible to carry out ultrafiltration repeatedly, for example two to ten times. Alternatively, ultrafiltration may also be carried out continuously, until reaching the desired degree of purity. The desired degree of purity may be basically selected at any desired level.

In another aspect, the present invention relates to a polymer which is a product of crosslinking of a radiation-curable prepolymer of the invention (described-above) in the presence or preferably in the absence of one or more additional vinylic monomers. As already mentioned above, the radiation-curable prepolymers according to the invention may be crosslinked in an extremely effective and well-directed manner upon actinic irradiation, in particular by UV irradiation. Crosslinking may take place in the presence or preferably in the absence of an additional vinylic monomer. The resulting crosslinked polymers are insoluble in water.

The polymer of the invention is a hydrogel, and when fully hydrated (i.e. the water content is in equilibrium with a saline solution, typically achieved within 45 minutes for a contact lens-shaped piece of polymer) has a water content of 30-90%, preferably 45-80%, by weight. Preferably, the polymer, when fully hydrated, has an averaged contact angle of 75 degrees or less, more preferably 65 degrees or less.

An "average contact angle" refers to a contact angle of water on a surface of a material (measured by Sessile Drop method), which is obtained by averaging measurements of at least 3 individual samples (e.g., contact lenses). Average contact angles (Sessile Drop) of contact lenses can be measured using a VCA 2500 XE contact angle measurement device from AST, Inc., located in Boston, Mass. This equipment is capable of measuring advancing or receding contact angles or sessile (static) contact angles. The measurements are preferably performed on fully hydrated materials.

Contact angle is a general measure of the surface hydrophilicity of a contact lens or an article (e.g., the cavity surface of a container). In particular, a low contact angle corresponds to more hydrophilic surface.

A "vinylic monomer", as used herein, refers to a low molecular weight compound that has an ethylenically unsaturated group and can be polymerized actinically or thermally. Low molecular weight typically means average molecular weights less than 700 Daltons. Exemplary ethylenically unsaturated groups include without limitation acryloyl, methacryloyl, allyl, vinyl, styrenyl, or other C=C containing groups.

In a further aspect, the present invention provides a medical device, preferably an ophthalmic device, more preferably a contact lens, which is obtained by crosslinking an above-described radiation-curable prepolymer of the invention in the presence of or preferably in the absence of one or more additional vinylic monomers.

A "medical device", as used herein, refers to a device or a part thereof having one or more surfaces that contact tissue, blood, or other bodily fluids of patients in the course of their operation or utility. Exemplary medical devices include: (1) extracorporeal devices for use in surgery such as blood oxygenators, blood pumps, blood sensors, tubing used to carry blood and the like which contact blood which is then returned to the patient; (2) prostheses implanted in a human or animal body such as vascular grafts, stents, pacemaker leads, heart valves, and the like that are implanted in blood vessels or in the heart; (3) devices for temporary intravascular use such as catheters, guide wires, and the like which are placed into blood vessels or the heart for purposes of monitoring or repair; (4) artificial tissues such as artificial skin for burn patients; (5) dentifrices, dental moldings; (6) ophthalmic devices. In a preferred embodiment, medical devices are ophthalmic devices; and (7) cases or containers for storing ophthalmic devices or ophthalmic solutions.

An "ophthalmic device", as used herein, refers to a contact lens (hard or soft), an intraocular lens, a corneal onlay, other ophthalmic devices (e.g., stents, or the like) used on or about the eye or ocular vicinity.

An ophthalmic device is preferably a contact lens which is preferably characterized by having: a water content of from about 30% to about 90%, preferably from about 45% to about 75% by weight; an elongation at break of at least 50%, preferably at least 100%, more preferably at least 150%, and a modulus of from about 0.05 to about 2.0 Mpa, preferably from about 0.2 to about 1.5 MPa, more preferably from about 0.3 to about 1.0 MPa. Preferably, the contact lens, when fully hydrated, has an averaged contact angle of 75 degrees or less, more preferably 65 degrees or less.

It is discovered that by having polyisocyanate, e.g., a triisocyanate, especially the isocyanurate trimer of a diisocyanate present in the mixture for preparing the amine- or isocyanate-capped polyurea, the mechanic/physical properties of contact lenses from a prepolymer of the invention can be enhanced. For example, a contact lens, prepared from a radiation-curable prepolymer having segments derived from the isocyanurate trimer of a diisocyanate, can have an enhanced thermal stability and a decreased susceptibility to autoclave-induced change in modulus.

Typically, a "decreased susceptibility to autoclave-induced change in modulus" of a contact lens, which is prepared from a radiation-curable prepolymer having segments derived from a triisocyanate (especially the isocyanurate trimer of a diisocyanate), is characterized by having a reduction (preferably at least a 15% reduction, more preferably at least a 30% reduction, even more preferably at least a 45% reduction) of autoclave-induced modulus change (i.e., difference in modulus between before and after a number of autoclave cycles) when comparing with a contact lens prepared from a radiation-curable prepolymer without segments derived from a triisocyanate (especially the isocyanurate trimer of a diisocyanate).

An "enhanced thermal stability" of a contact lens, which is prepared from a radiation-curable prepolymer having segments derived from a triisocyanate (especially the isocyanurate trimer of a diisocyanate), is characterized by having a reduction (preferably at least a 30% reduction, more preferably at least a 50% reduction, even more preferably at least a 100% reduction) of irreversible change in lens diameter with storage time at about 80° C. (i.e., difference in lens diameter between measurements at time zero and a given length of storage time at about 80° C., when comparing with a contact lens prepared from a radiation-curable prepolymer without segments derived from a triisocyanate (especially the isocyanurate trimer of a diisocyanate).

In the case of photo-crosslinking, a photo-initiator is suitably added which can initiate radical crosslinking. Examples of these are familiar to the person skilled in the art, and suitable photo-initiators which may be mentioned in particular are benzoin-methylether, 1-hydroxy-cyclo-hexyl-phenylketone, Darocure® 1173 or Irgacure® types. Crosslinking may be commenced by actinic radiation, e.g. UV light, or by ionized radiation, e.g. gamma rays or X-rays.

Photo-crosslinking may also be carried out without adding a solvent, e.g. if the radiation-curable prepolymer is a liquid or readily meltable prepolymer, or it takes place in a suitable solvent. Suitable solvents are basically all solvents that dissolve the radiation-curable prepolymers according to the invention and optionally the additional vinylic monomers, e.g. water, alcohols such as lower alkanols, e.g. ethanol or methanol, furthermore carboxylic acid amides, such as dimethyl-formamide, or dimethyl sulphoxide, and likewise mixtures of suitable solvents, e.g. mixtures of water with an alcohol, such as a water/ethanol or a water/methanol mixture.

Photo-crosslinking is preferably effected whilst solvent-free or essentially solvent-free or directly from an aqueous solution of the prepolymers according to the invention, which may be obtained as the result of the preferred purification step, ultrafiltration, optionally after adding an additional vinylic monomers. For example, photo-crosslinking may be undertaken from a 15 to 90% aqueous solution.

The process for the production of the crosslinked polymers according to the invention comprises radiation-crosslinking a radiation-curable prepolymer of the invention and optionally further copolymerizable vinylic monomers, especially in substantially pure form, i.e. for example after ultrafiltration once or several times whilst solvent-free or substantially solvent-free or in solution, especially in aqueous solution, in the presence or preferably in the absence of an additional vinylic monomer, preferably using a photoinitiator.

The vinylic monomer which may be additionally used for photo-crosslinking in accordance with the invention may be hydrophilic, hydrophobic or may be a mixture of a hydrophobic and a hydrophilic vinylic monomer. Suitable vinylic monomers include especially those normally used for the manufacture of contact lenses.

A "vinylic monomer", as used herein, refers to a low molecular weight compound that has an ethylenically unsaturated group and can be polymerized actinically or thermally. Low molecular weight typically means average molecular weights less than 700 Daltons. Exemplary ethylenically unsaturated groups include without limitation acryloyl, methacryloyl, allyl, vinyl, styrenyl, or other C=C containing groups.

A "hydrophilic vinylic monomer" refers to a monomer which as a homopolymer typically yields a polymer that is water-soluble or can absorb at least 10 percent by weight water. A "hydrophobic vinylic monomer" refers to a monomer which as a homopolymer typically yields a polymer that is insoluble in water and can absorb less than 10 percent by weight water.

It is preferable to use a hydrophobic vinylic monomer, or a mixture of a hydrophobic vinylic monomer with a hydrophilic vinylic monomer, whereby this mixture contains at least 50 percent by weight of a hydrophobic vinyl monomer. In this way, the mechanical properties of the polymer may be improved without the water content dropping substantially. Both conventional hydrophobic vinylic monomers and conventional hydrophilic vinylic monomers are suitable for copolymerization with the radiation-curable prepolymers according to the invention.

Suitable hydrophobic vinylic monomers include, without limitation, $C_1$-$C_{18}$-alkylacrylates and -methacrylates, $C_3$-$C_{18}$ alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-halo-alkenes, styrene, $C_1$-$C_6$-alkylstyrene, vinylalkylethers in which the alkyl moiety has 1 to 6 carbon atoms, $C_2$-$C_{10}$-perfluoralkyl-acrylates and -methacrylates or correspondingly partially fluorinated acrylates and methacrylates, $C_3$-$C_{12}$-perfluoralkyl-ethyl-thiocarbonylaminoethyl-acrylates and -methacrylates, acryloxy and methacryloxy-alkyl-siloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

Examples of suitable hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silylpropyl methacrylate, 3-methacryloxypropyl-pentamethyl-disiloxane and bis(methacryloxypropyl)-tetramethyl-disiloxane.

Suitable hydrophilic vinylic monomers include, without limitation, hydroxy-substituted lower alkylacrylates and -methacrylates, acrylamide, methacrylamide, lower alkyl-acrylamides and -methacrylamides, ethoxylated acrylates and methacrylates, hydroxy-substituted lower alkyl-acrylamides and -methacrylamides, hydroxy-substituted lower alkylvinyl-ethers, sodium ethylene sulphonate, sodium styrene sulphonate, 2-acrylamido-2-methyl-propane-sulphonic acid, N-vinyl pyrrole, N-vinyl succinimide, N-vinyl pyrrolidone, 2- or 4-vinyl pyridine, acrylic acid, methacrylic acid, amino- (whereby the term "amino" also includes quaternary ammonium), mono-lower-alkylamino- or di-lower-alkylamino-lower-alkyl-acrylates and -methacrylates, allyl alcohol and the like. Preference is given e.g. to hydroxy-substituted $C_2$-$C_4$-alkyl(meth)acrylates, five- to seven-membered N-vinyl-lactams, N,N-di-$C_1$-$C_4$-alkyl-methacrylamides and vinylically unsaturated carboxylic acids with a total of 3 to 5 carbon atoms.

Examples of suitable hydrophilic vinylic monomers include hydroxyethyl methacrylate, hydroxyethyl acrylate, acrylamide, methacrylamide, dimethylacrylamide, allyl alcohol, vinyl pyridine, vinyl pyrrolidone, glycerol methacrylate, N-(1,1-dimethyl-3-oxobutyl)acrylamide, and the like.

Preferred hydrophobic vinylic monomers are methyl methacrylate and vinyl acetate. Preferred hydrophilic vinylic monomers are 2-hydroxyethyl methacrylate, N-vinyl pyrrolidone and acrylamide.

The processing according to the invention for molding radiation-curable prepolymers into ophthalmic articles, especially contact lenses, may take place in a manner known per se, for example, photo-crosslinking of the radiation-curable prepolymers according to the invention in an appropriate contact lens mold. Further examples of molded articles according to the invention, apart from contact lenses, are e.g. intra-ocular lenses or eye dressings, furthermore biomedical articles which may be used in surgery, such as heart valves, artificial arteries or the like, also films or membranes, e.g. membranes for diffusion control, photo-structurable films for data storage, or photo resist materials, e.g. membranes or molded articles for etch resist printing or screen resist printing.

In another further aspect; the present invention provides a method for producing an ophthalmic device, the method comprising the steps of: a) introducing an above-described radiation-curable prepolymer of the invention, which is liquid or readily meltable at room temperature, and which is essentially free from solvents, into a mold, in the presence or preferably in the absence of one or more additional vinylic monomers, and optionally in the presence of a photo-initiator, b) crosslinking by actinic radiation the radiation-curable prepolymer, and c) opening the mold so that the device can be removed from the mold.

In a still further aspect, the present invention provides a method for producing an ophthalmic device, the method comprising the steps of: a) introducing an aqueous solution of an above-described radiation-curable prepolymer of the invention, in the presence or preferably in the absence of one or more additional vinylic monomers, and optionally in the presence of a photo-initiator, into a mold; b) crosslinking by actinic radiation the radiation-curable prepolymer, and c) opening the mold so that the device can be removed from the mold.

Preferably the viscosity of the aqueous formulation is 15 to 100000 cps, more preferably 50-2000 cps, at room temperature.

The radiation-curable prepolymers according to the invention may be introduced into a mold by methods known per se, especially conventional dispensing, e.g. dropwise addition. If vinylic monomers are present, the monomers employed are those mentioned above, in desired quantities. Any, vinylic monomers that are optionally present are advantageously first of all mixed with the prepolymer according to the invention and then introduced into the mold.

Appropriate molds are made, for example, from polypropylene. Suitable materials for re-usable mounds are e.g. quartz, sapphire glass or metals.

If the molded articles to be produced are contact lenses, these may be produced in a manner known per se, e.g. in a conventional "spin-casting mold", as described for example in U.S. Pat. No. 3,408,429, or by the so-called full mold process in a static form, as described e.g. in U.S. Pat. Nos. 4,347,198, 5,508,317, 5,583,463, 5,789,464, and 5,849,810.

Crosslinking may be initiated in the mold e.g. by means of actinic radiation, such as UV irradiation, ionizing radiation (e.g., gamma or X-ray irradiation).

As already mentioned, photo-crosslinking is advantageously carried out in the presence of a photo-initiator which can initiate radical crosslinking. The photo-initiator is advantageously added to the prepolymers according to the invention prior to introducing them into the mold, preferably by mixing the polymers and the photo-initiator together. The amount of photo-initiator may be selected from a wide range, whereby an amount of up to 0.05 g/g polymer and especially up to 0.003 g/g polymer has proved favorable.

What is notable is that the crosslinking according to the invention may be effected in a very short time, e.g. in $\leq 60$ minutes, advantageously in $\leq 20$ minutes, preferably in $\leq 10$ minutes, most preferably in $\leq 5$ minutes, particularly preferably in 1 to 60 seconds and most particularly in 1 to 30 seconds.

What is also notable is that the contact lenses according to the invention can be produced from a radiation-curable prepolymer in a very simple and efficient way compared with the prior art. This is based on many factors. On the one hand, the starting materials may be acquired or produced inexpensively. Secondly, there is the advantage that the prepolymers are surprisingly stable, so that they may undergo a high degree of purification. Therefore, for crosslinking, a polymer may be used which requires practically no more subsequent purification, such as in particular complicated extraction of unpolymerized constituents. Furthermore, crosslinking may take place solvent-free or in aqueous solution, so that a subsequent solvent exchange or the hydration step is not necessary. Finally, photo-polymerization is effected within a short period, so that from this point of view also the production process for the contact lenses according to the invention may be set up in an extremely economic way.

Opening of the mold so that the molded article can be removed from the mold may take place in a manner known per se.

If the molded article produced according to the invention is a contact lens which is produced solvent-free from an already purified prepolymer according to the invention, then after removal of the molded article, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens is expanded, for example, in water, in an aqueous salt solution, especially an aqueous salt solution having an osmolarity of about 200 to 450 milliosmole in 1000 ml (unit: mOsm/l), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

The aqueous salt solutions used for hydration are advantageously solutions of physiologically compatible salts, such as buffer salts conventionally used in the field of contact lens care, e.g. phosphate salts, or isotonizing agents conventionally used in the field of contact lens care, such as in particular alkali halides, e.g. sodium chloride, or solutions of mixtures thereof. One example of an especially suitable salt solution is an artificial, preferably buffered lachrymal fluid, which is adapted to natural lachrymal fluid as regards pH value and osmolarity, e.g. an unbuffered or preferably buffered common salt solution, for example buffered by phosphate buffer, whose osmolarity and pH value correspond to the osmolarity and pH value of human lachrymal fluid.

The above-defined hydration fluids are preferably pure, i.e. free or substantially free from undesired constituents. This is most preferably pure water or an artificial lachrymal fluid as described above.

If the molded article produced according to the invention is a contact lens which is produced from an aqueous solution of an already purified prepolymer according to the invention, then the crosslinked product also does not contain any troublesome impurities. It is therefore not necessary to carry out subsequent extraction. Since crosslinking is carried out in an essentially aqueous solution, it is additionally unnecessary to carry out subsequent hydration. The contact lenses obtainable by this process are therefore notable, according to an advantageous embodiment, for the fact that they are suitable for their intended usage without extraction. By intended usage is understood, in this context, that the contact lenses can be used in the human eye.

The contact lenses obtained according to the invention have a wide range of unusual and extremely advantageous properties. One of these properties which may be named is for example its excellent compatibility with the human cornea, which is based on a well-balanced relationship between water content, oxygen permeability and good mechanical properties including elasticity and durability. Moreover, the contact lenses according to the invention have high resistance of shape. No changes in shape can be detected even after autoclaving e.g. at about 120° C. The contact lenses obtained according to the invention can also have a water content of from about 30% to about 90%, an elongation at break of at least 150%, and a modulus of from about 0.3 to about 1.0 Mpa, an enhanced thermal stability and a decreased susceptibility to autoclave-induced change in modulus.

Of course, all the above-mentioned advantages apply not only to contact lenses, but also to other molded articles according to the invention. The total of the different advantageous aspects during production of the molded articles according to the invention leads to the suitability of the molded articles in particular as mass-produced articles, for example, as contact lenses which are for daily use and/or for weekly use.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Preparation of PEG-Urea Prepolymer. Place 400 grams of tetrahydrofuran (THF), 300 grams of water and 180 amine group milli-equivalents (meq) of Jeffamine® XTJ501 (Hunstman Chemicals) into a jacketed 1 L reactor and cool to an internal temperature of 0 to 5° C. with agitation. A solution containing 75 isocyante group meq of isophorone diisocyanate (Aldrich Chemicals) and 75 isocyante group meq of VESTANAT® T1890/100 (Degussa Chemicals) in about 60 grams of THF is added dropwise, with stirring, over a period of approximately 30 minutes. Stir the reaction mixture for a further 30 minutes whilst maintaining an internal temperature of 0 to 5° C. Three additions of 18 grams of sodium carbonate (20% aqueous), followed by 2.75 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafilteredi over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO (4-hydroxy-2,2,6,6,-tetramethyl-1-piperidinyloxy, free radical).

Example 2

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 99 isocyante group meq of isophorone diisocyanate (Aldrich Chemicals) and 21 isocyante group meq of VESTANAT®11890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 3

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 99 isocyanate group meq of trimethyl-1,6-diisocyanatohexane (Aldrich Chemicals) and 21 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 4

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 78 isocyante group meq of isophorone diisocyanate (Aldrich Chemicals) and 42 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 5

Preparation of PEG-Urea Prepolymer. Place 400 grams of tetrahydrofuran (THF), 250 grams of water, 150 amine group milli-equivalents (meq) of Jeffamine® XTJ501 (Hunstman Chemicals) and 31 amine group meq of 1,6-hexamethylenediamine (Aldrich Chemicals) into a jacketed 1 L reactor and cool to an internal temperature of 0 to 5° C. with agitation. A solution containing 130 isocyante group meq of isophorone diisocyanate (Aldrich Chemicals) and 21 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 6

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 105 isocyante group meq of isophorone diisocyanate (Aldrich Chemicals) and 21 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 16 grams of sodium carbonate (20% aqueous), followed by 2.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 7

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 52.5 isocyante group meq of isophorone diisocyanate (Aldrich Chemicals), 52.5 isocyanate group meq of trimethyl-1,6-diisocyanatohexane and 21 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 16 grams of sodium carbonate (20% aqueous), followed by 2.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 8

Preparation of PEG-Urea Prepolymer. Place 400 grams of tetrahydrofuran (THF), 250 grams of water, 100 amine group milli-equivalents (meq) of Jeffamine® XTJ501 (Hunstman Chemicals) and 50 amine group meq of Jeffamine® XTJ502 (Hunstman Chemicals) into a jacketed 1 L reactor and cool to an internal temperature of 0 to 5° C. with agitation. A solution containing 99 isocyante group meq of isophorone diisocyanate (Aldrich Chemicals) and 21 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 9

Preparation of PEG-Urea Prepolymer. Place 400 grams of tetrahydrofuran (THF), 250 grams of water, 50 amine group milli-equivalents (meq) of Jeffamine® XTJ501 (Hunstman Chemicals) and 50 amine group meq of Jeffamine® XTJ502 (Hunstman Chemicals), 50 meq 1,2-diaminecyclohexane (Aldrich Chemicals) into a jacketed 1 L reactor and cool to an internal temperature of 0 to 5° C. with agitation. A solution containing 99 isocyante group meq of isophorone diisocyanate (Aldrich Chemicals) and 21 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 10

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 99 isocyanate group meq of 1,6-diisocyanotohexane (Aldrich Chemicals) and 21 isocyanate group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 11

Preparation of PEG-Urea Prepolymer. Place 400 grams of tetrahydrofuran (THF), 250 grams of water and 180 amine group milli-equivalents (meq) of Jeffamine® XTJ501 (Hunstman Chemicals) into a jacketed 1 L reactor and cool to an internal temperature of 0 to 5° C. with agitation. A solution containing 75 isocyanate group meq of 1,6-diisocyanotohexane (Aldrich Chemicals) and 75 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 20 grams of sodium carbonate (20% aqueous), followed by 2.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 12

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 93 isocyanate group meq of isophorone diisocyananate (Aldrich Chemicals) and 42 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 10 grams of sodium carbonate (20% aqueous), followed by 1.4 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 13

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 93 isocyanate group amine group meq of 1,6-diisocyanatohexane (Aldrich Chemicals) and 42 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 10 grams of sodium carbonate (20% aqueous), followed by 1.4 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 14

Preparation of PEG-Urea Prepolymer. Place 400 grams of tetrahydrofuran (THF), 250 grams of water and 150 amine group milli-equivalents (meq) of Jeffamine® XTJ501 (Hunstman Chemicals) into a jacketed 1 L reactor and cool to an internal temperature of 0 to 5° C. with agitation. A solution containing 85.5 isocyante group meq of isophorone diisocyanate (Aldrich Chemicals) and 42 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 15 grams of sodium carbonate (20% aqueous), followed by 1.8 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 15

Preparation of PEG-Urea Prepolymer. Place 400 grams of tetrahydrofuran (THF), 250 grams of water, 105 amine group milli-equivalents (meq) of Jeffamine® XTJ501 (Hunstman Chemicals) and 52.5 amine group meq of Jeffamine® XTJ502 (Huntsman Chemical) and 39 amine group meq of diethylentriamine (Aldrich Chemicals) into a jacketed 1 L reactor and cool to an internal temperature of 0 to 5° C. with agitation. A solution containing 142 isocyante group meq of isophorone diisocyanate (Aldrich Chemicals) and 39 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 11 grams of sodium carbonate (20% aqueous), followed by 1.6 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 16

Preparation of PEG-Urea Prepolymer. Place 400 grams of tetrahydrofuran (THF), 250 grams of water, 105 amine group milli-equivalents (meq) of Jeffamine® XTJ501 (Hunstman Chemicals) and 52.5 amine group meq of Jeffamine® XTJ502 (Huntsman Chemicals) and 39 amine group meq of diethylentriamine (Aldrich Chemicals) into a jacketed 1 L reactor and cool to an internal temperature of 0 to 5° C. with agitation. A solution containing 142 isocyanate group meq of 1,6-diisocyanatohexane (Aldrich Chemicals) and 39 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 11 grams of sodium carbonate (20% aqueous), followed by 1.6 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 17

Preparation of PEG-Urea Prepolymer. Place 400 grams of tetrahydrofuran (THF), 250 grams of water and 100 amine group milli-equivalents (meq) of Jeffamine® XTJ502 (Hunstman Chemicals) into a jacketed 1 L reactor and cool to an internal temperature of 0 to 5° C. with agitation. A solution containing 32.5 isocyante group meq of isophorone diisocyanate (Aldrich Chemicals) and 32.5 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 21 grams of sodium carbonate (20% aqueous), followed by 3.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 18

Preparation of PEG-Urea Prepolymer. Place 400 grams of tetrahydrofuran (THF), 250 grams of water and 100 amine group milli-equivalents (meq) of Jeffamine® XTJ502 (Hunstman Chemicals) into a jacketed 1 L reactor and cool to an internal temperature of 0 to 5° C. with agitation. A solution containing 22.5 isocyante group meq of isophorone diisocyanate (Aldrich Chemicals) and 32.5 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 26 grams of sodium carbonate (20% aqueous), followed by 4.3 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 19

Preparation of PEG-Urea Prepolymer. Place 400 grams of tetrahydrofuran (THF), 250 grams of water, 84 amine group milli-equivalents (meq) of Jeffamine® XTJ501 (Huntsman Chemicals), 50 amine group meq of Jeffamine® XTJ502 (Huntsman Chemicals) and 26.8 amine group meq of diethylentriamine (Aldrich Chemicals) into a jacketed 1 L reactor and cool to an internal temperature of 0 to 5° C. with agitation. A solution containing 89.3 isocyante group meq of isophorone diisocyanate (Aldrich Chemicals) and 26.8 isocyante group meq of VESTANAT T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 28 grams of sodium carbonate (20% aqueous), followed by 4.5 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 20

Preparation of PEG-Urea Prepolymer. Place 400 grams of tetrahydrofuran (THF), 250 grams of water, 84 amine group milli-equivalents (meq) of Jeffamine® XTJ501 (HUntman Chemicals), 50 amine group meq of Jeffamine® XTJ502 (Huntsman Chemicals) and 26.8 amine group meq of bis-hexamethylenetriamine (Aldrich Chemicals) into a jacketed 1 L reactor and cool to an internal temperature of 0 to 5° C. with agitation. A solution containing 89.3 isocyante group meq of isophorone diisocyanate (Aldrich Chemicals) and 26.8 isocyante group meq of VESTANAT®11890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 28 grams of sodium carbonate (20% aqueous), followed by 4.5 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 21

Preparation of PEG-Urea Prepolymer. Place 400 grams of tetrahydrofuran (THF), 250 grams of water, 67 amine group milli-equivalents (meq) of Jeffamine® XTJ501 (Hunstman Chemicals), 67 amine group meq of Jeffamine® XTJ502 (Hunstman Chemicals) and 26.8 amine group meq of bis-hexamethylenetriamine (Aldrich Chemicals) into a jacketed 1 L reactor and cool to an internal temperature of 0 to 5° C. with agitation. A solution containing 89.3 isocyante group meq of isophorone diisocyanate (Aldrich Chemicals) and 26.8 isocyante group meq of VESTANAT®11890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 28 grams of sodium carbonate (20% aqueous), followed by 4.5 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 22

Preparation of PEG-Urea Prepolymer. Place 400 grams of tetrahydrofuran (THF), 250 grams of water, 67 amine group milli-equivalents (meq) of Jeffamine® XTJ501 (Hunstman Chemicals), 67 amine group meq of Jeffamine® XTJ502 (Hunstman Chemicals) and 26.8 amine group meq of bis-hexamethylenetriamine (Aldrich Chemicals) into a jacketed 1 L reactor and cool to an internal temperature of 0 to 5° C. with agitation. A solution containing 74 isocyante group meq of isophorone diisocyanate (Aldrich Chemicals) and 26.8 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 35 grams of sodium carbonate (20% aqueous), followed by 5.7 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 23

Preparation of PEG-Urea Prepolymer. Place 400 grams of tetrahydrofuran (THF), 250 grams of water and 100 amine group milli-equivalents (meq) of Jeffamine® XTJ502 (Hunstman Chemicals) into a jacketed 1 L reactor and cool to an internal temperature of 0 to 5° C. with agitation. A solution containing 55 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 26 grams of sodium carbonate (20% aqueous), followed by 4.3 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 24

Preparation of PEG-Urea Prepolymer. Place 400 grams of tetrahydrofuran (THF), 250 grams of water and 100 amine group milli-equivalents (meq) of Jeffamine® XTJ502 (Hunstman Chemicals) into a jacketed 1 L reactor and cool to an internal temperature of 0 to 5° C. with agitation. A solution containing 11 isocyante group meq of isophorone diisocyanate (Aldrich Chemicals) and 44 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 26 grams of sodium carbonate (20% aqueous), followed by 4.3 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 25

Preparation of PEG-Urea Prepolymer. Place 400 grams of tetrahydrofuran (THF), 250 grams of water, 100 amine group milli-equivalents (meq) of Jeffamine® XTJ502 (Hunstman Chemicals) and 40 amine group meq of diethylentriamine (Aldrich Chemicals) into a jacketed 1 L reactor and cool to an internal temperature of 0 to 5° C. with agitation. A solution containing 45 isocyante group meq of isophorone diisocyanate (Aldrich Chemicals) and 40 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 30 grams of sodium carbonate (20% aqueous), followed by 5.3 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 26

Preparation of PEG-Urea Prepolymer. Place 400 grams of tetrahydrofuran (THF), 250 grams of water, 84 amine group milli-equivalents (meq) of Jeffamine® XTJ501 (Hunstman Chemicals), 50 amine group meq of Jeffamine® XTJ502 (Hunstman Chemicals) and 26.8 amine group meq of bis-hexamethylenetriamine (Aldrich Chemicals) into a jacketed 1 L reactor and cool to an internal temperature of 0 to 5° C. with agitation. A solution containing 100 isocyante group meq of isophorone diisocyanate (Aldrich Chemicals) and 26.8 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 21.5 grams of sodium carbonate (20% aqueous), followed by 3.4 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 27

Preparation of PEG-Urea Prepolymer. Place 400 grams of tetrahydrofuran (THF), 250 grams of water, 84 amine group milli-equivalents (meq) of Jeffamine® XTJ501 (Hunstman Chemicals), 50 amine group meq of Jeffamine® XTJ502 (Hunstman Chemicals) and 26.8 amine group meq of bis-hexamethylenetriamine (Aldrich Chemicals) into a jacketed 1 L reactor and cool to an internal temperature of 0 to 5° C. with agitation. A solution containing 95 isocyante group meq of isophorone diisocyanate (Aldrich Chemicals) and 26.8 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 23.5 grams of sodium carbonate (20% aqueous), followed by 3.9 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 28

Preparation of PEG-Urea Prepolymer. Place 400 grams of tetrahydrofuran (THF), 250 grams of water, 84 amine group milli-equivalents (meq) of Jeffamine® XTJ501 (Hunstman Chemicals), 50 amine group meq of Jeffamine® XTJ502 (Hunstman Chemicals) and 45 amine group meq of bis-hexamethylenetriamine (Aldrich Chemicals) into a jacketed 1 L reactor and cool to an internal temperature of 0 to 5° C. with agitation. A solution containing 117.2 isocyante group meq of isophorone diisocyanate (Aldrich Chemicals) and 26.8 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 19 grams of sodium carbonate (20% aqueous), followed by 3.3 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 29

Preparation of PEG-Urea Prepolymer. Place 400 grams of tetrahydrofuran (THF), 250 grams of water, 84 amine group milli-equivalents (meq) of Jeffamine® XTJ501 (Hunstman Chemicals), 50 amine group meq of Jeffamine® XTJ502 (Hunstman Chemicals) and 12 amine group meq of bis-hexamethylenetriamine (Aldrich Chemicals) into a jacketed 1 L reactor and cool to an internal temperature of 0 to 5° C. with agitation. A solution containing 74.6 isocyante group meq of isophorone diisocyanate (Aldrich Chemicals) and 26.8 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 24 grams of sodium carbonate (20% aqueous), followed by 4.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 30

Preparation of PEG-Urea Prepolymer. Place 400 grams of tetrahydrofuran (THF), 250 grams of water, 136 amine group milli-equivalents (meq) of Jeffamine® XTJ501 (Hunstman Chemicals), 34 amine group meq of Jeffamine® XTJ502 (Hunstman Chemicals) and 33 amine group meq of bis-hexamethylenetriamine (Aldrich Chemicals) into a jacketed 1 L reactor and cool to an internal temperature of 0 to 5° C. with agitation. A solution containing 138 isocyante group meq of isophorone diisocyanate (Aldrich Chemicals) and 27 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 24 grams of sodium carbonate (20% aqueous), followed by 3.6 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 31

Preparation of PEG-Urea Prepolymer. Place 400 grams of tetrahydrofuran (THF), 250 grams of water, 85 amine group milli-equivalents (meq) of Jeffamine® XTJ501 (Hunstman Chemicals), 50 amine group meq of Jeffamine® XTJ502 (Hunstman Chemicals) and 12.2 amine group meq of bis-hexamethylenetriamine (Aldrich Chemicals) into a jacketed 1 L reactor and cool to an internal temperature of 0 to 5° C. with agitation. A solution containing 86.5 isocyante group meq of isophorone diisocyanate (Aldrich Chemicals) and 27 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 18.5 grams of sodium carbonate (20% aqueous), followed by 3.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 50 µS/cm. The solution is further purified by passing the solution through a 0.45 µm Teflon membrane under pressure. The solution is stabilized with 20-200 ppm of hydroxyl-TEMPO.

Example 32

Preparation of PEG-Urea Prepolymer. Place 400 grams of tetrahydrofuran (THF), 250 grams of water, 85 amine group milli-equivalents (meq) of Jeffamine® XTJ501 (Hunstman Chemicals), 50 amine group meq of Jeffamine® XTJ502 (Hunstman Chemicals) and 19 amine group meq of bis-hexamethylenetriamine (Aldrich Chemicals) into a jacketed 1 L reactor and cool to an internal temperature of 0 to 5° C. with agitation. A solution containing 93.2 isocyante group meq of isophorone diisocyanate (Aldrich Chemicals) and 27 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 19 grams of sodium carbonate (20% aqueous), followed by 3.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 33

Preparation of PEG-Urea Prepolymer. Place 400 grams of tetrahydrofuran (THF), 250 grams of water, 108 amine group milli-equivalents (meq) of Jeffamine® XTJ501 (Hunstman Chemicals), 27 amine group meq of Jeffamine® XTJ502 (Hunstman Chemicals) and 9 amine group meq of bis-hexamethylenetriamine (Aldrich Chemicals) into a jacketed 1 L reactor and cool to an internal temperature of 0 to 5° C. with agitation. A solution containing 88 isocyante group meq of isophorone diisocyanate (Aldrich Chemicals) and 26 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 17 grams of sodium carbonate (20% aqueous), followed by 2.9 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 34

Preparation of PEG-Urea Prepolymer. Place 400 grams of tetrahydrofuran (THF), 250 grams of water, 108 amine group milli-equivalents (meq) of Jeffamine® XTJ501 (Hunstman Chemicals), 27 amine group meq of Jeffamine® XTJ502 (Hunstman Chemicals) and 9 amine group meq of bis-hexamethylenetriamine (Aldrich Chemicals) into a jacketed 1 L reactor and cool to an internal temperature of 0 to 5° C. with agitation. A solution containing 92 isocyante group meq of isophorone diisocyanate (Aldrich Chemicals) and 26 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 15 grams of sodium carbonate (20% aqueous), followed by 2.5 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 35

Preparation of PEG-Urea Prepolymer. Place 400 grams of tetrahydrofuran (THF), 250 grams of water, 96 amine group milli-equivalents (meq) of Jeffamine® XTJ501 (Hunstman Chemicals), 39 amine group meq of Jeffamine® XTJ502 (Hunstman Chemicals) and 10.5 amine group meq of bis-hexamethylenetriamine (Aldrich Chemicals) into a jacketed 1 L reactor and cool to an internal temperature of 0 to 5° C. with agitation. A solution containing 86 isocyante group meq of isophorone diisocyanate (Aldrich Chemicals) and 26.5 isocyante group meq of VESTANAT® T1890/100 (Degussa Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 18.5 grams of sodium carbonate (20% aqueous), followed by 3.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 36

Preparation of PEG-Urea Prepolymer. Place 400 grams of tetrahydrofuran (THF), 250 grams of water, 85 amine group milli-equivalents (meq) of Jeffamine® XTJ501 (Hunstman Chemicals), 50 amine group meq of Jeffamine® XTJ502 (Hunstman Chemicals) and 40 amine group meq of bis-hexamethylenetriamine (Aldrich Chemicals) into a jacketed 1 L reactor and cool to an internal temperature of 0 to 5° C. with agitation. A solution containing 140 isocyante group meq of isophorone diisocyanate (Aldrich Chemicals) in about 80 grams of THF is added dropwise, with stirring, over a period of approximately 30 minutes. Stir the reaction mixture for a further 30 minutes whilst maintaining an internal temperature of 0 to 5° C. Three additions of 19 grams of sodium carbonate (20% aqueous), followed by 3.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 37

Preparation of PEG-Urea Prepolymer. Place 400 grams of tetrahydrofuran (THF), 250 grams of water, 84 amine group milli equivalents (meq) of Jeffamine® XTJ501 (Hunstman Chemicals), 50 amine group meq of Jeffamine® XTJ502 (Hunstman Chemicals), 26.8 amine group meq of bis-hexamethylenetriamine (Aldrich Chemicals) into a jacketed 1 L reactor. At an temperature of 0 to 5° C., add a solution of 110.7 isocyante group meq of isophorone diisocyanate (Aldrich Chemicals), 16.13 meq of Desmodur® N 3800 (Bayer), and about 85 grams of THF drop wise with intensive stirring over about 30 minutes. Stir the reaction mixture for a further 30 minutes whilst maintaining an internal temperature of 0 to 5° C. Three additions of 21.5 grams of sodium carbonate (20% aqueous), followed by 3.2 grams of acryloyl chloride (Aldrich Chemicals) are made with approximately 30 minutes between each addition, whilst maintaining an internal temperature below 10° C. Stir the reaction mixture for a further 30 minutes whilst allowing the internal temperature to reach ambient. The reaction mixture is filtered over 17 μm sintered glass filter. The product is then concentrated on a rotary evaporator to afford a solution essentially free of THF. The solution is ultrafiltered over a 1-kiloDalton membrane until the conductivity of the permeate measures below 50 μS/cm. The solution is further purified by passing the solution through a 0.45 μm Teflon membrane under pressure. The solution is stabilized with 20-200 ppm of hydroxyl-TEMPO.

Example 38

Preparation of PEG-Urea Prepolymer. Under ambient conditions place 400 grams of ethyl lactate, 84 amine group milliequivalents (meq) of Jeffamine® XTJ501 (Hunstman Chemicals), 50 amine group meq of Jeffamine® XTJ502 (Hunstman Chemicals) and 26.8 amine group meq of bis-hexamethylenetriamine (Aldrich Chemicals) into a 1 L reactor. A solution of 100 isocyante group meq of isophorone diisocyanate (Aldrich Chemicals) and 26.8 isocyante group meq of VESTANAT® T1890/100 (Degussa Chemicals) dissolved in approximately 80 grams of ethyl lactate is added dropwise, with stirring, over a period of approximately 30 minutes. Stir the reaction mixture for a further 30 minutes. Employing a pH Stat arrangement (Metrohm), to maintain a slightly basic pH with sodium hydroxide 5 wt % in ethanol, add 4 ml of acryloyl chloride (Aldrich Chemicals). The reaction mixture is filtered over 17 μm sintered glass filter. The product is diluted with water to obtain an organic aqueous solution that is approximately 75 w/v % water. The solution is ultrafiltered over a 1-kiloDalton membrane until the conductivity of the permeate measures below 50 μS/cm. The solution is further purified by passing the solution through a 0.45 μm Teflon membrane under pressure and stabilized with 20-200 ppm of hydroxyl-TEMPO.

Example 39

PEG-Urea Contact Lens Formulations. Reactive fluid formulations were prepared by mixing the purified PEG-Urea reactive prepolymer with water, photoinitiator (Irgacure 2959; Aldrich Chemicals) and 4-hydroxy-2,2,6,6-tetramethylpiperpiperindinyloxy, free radical (HO-TEMPO; Aldrich Chemicals) such that the total water content of the formulation is between 55 and 80 wt % and afforded lenses, after one autoclave cycle, have dimensions between 13.5-14.6 mm, when measured on a calibrated optical comparator.

Example 40

Determination of Cure Energy to Crosslink Formulations. Determination of the induction period and the incident energy required to actinically crosslink the reactive and fluid formulations to form a contact lens were performed by photorheological methodologies.

Photorheology measurements were conducted on a modified StressTech Rheometer, manufactured by ReoLogica Instruments, to measure shear modulus. Shear modulus is recorded by using a parallel plate arrangement, wherein the upper plate and the base plate comprise of quartz, through which UV irradiation from a light source can pass and be absorbed by a photoinitiator to form reactive species that will initiate free radical crosslinking polymerization. The light source is a UV-IQ400 manufactured by Dr. Groebel UV Electronic GmbH, fitted with a Phillips HPA-400/30S bulb. Light from the source is directed down a light guide and through a WG305 cut-off filter manufactured by Schott Glass, before being impinged on the quartz plate. The intensity of light that passes through this optical arrangement was measured by a RM-12 radiometer manufactured by Dr. Groebel Electronic GmbH and calibrated to the manufacture's standard. Intensity values are given in $mWcm^{-2}$ and all cure energies quoted are the sum Intensity ($mWcm^{-2}$)×time (seconds) and are given in milli Joules (mJ). The oscillation frequency of the photorheometer was set at 10 Hz and viscosity changes measured in a time resolved manner. Measurements were typically terminated 30 seconds after the cessation of increase in viscosity.

Example 41

Preparation of Contact Lenses. Typically 45-65 mg of fluid reactive polymer formulation is charged into the cavity of a female mold half and a male mold half is placed on top of the female mold half to form a mold assembly which is disclosed in detail in U.S. Pat. No. 6,203,909 B1, herein incorporated by reference in its entirety.

UV light is impinged on the mold arrangement. The light source is a UV-IQ400 manufactured by Dr. Groebel UV Electronic GmbH, fitted with a Phillip HPA-400/305 bulb. Light from the source is directed down a light guide and through a WG305 cut-off filter manufactured by Schott Glass. The intensity of light that passes through this optical arrangement is measured with a RM-12 radiometer manufactured by Dr. Groebel Electronic GmbH and calibrated to the manufactures' standard. The irradiation dose is controlled by using a fixed intensity of light and modulating the exposure time through the use of an automated shutter arrangement. The cure energy (mJ) determined by Example 39 is used to cure each respective PEG-Urea polymer formulation.

The mold is opened and the contact lens removed, washed with deioniosed water to remove excess unreacted formulation. The lens is placed in a small glass vial along with approximately 2.5 ml of buffer solution containing sodium citrate, sodium dihydrogen citrate, sodium chloride and deionised water, such that the osmolarity of the solution is between 250 and 400 mOsm. The vial is tightly sealed. The lens is then sterilized in an air over steam autoclave at 121° C. for a 30 minutes total cycle time.

Example 42

Evaluation Of Modulus and Elongation at Break of PEG-Urea Lenses. Lenses cast from −1.00 diopter molds are cut into strips of approximately 8.0 mm in length×3.0 mm in width×0.1 mm in thickness.

The strips are mounted on to a Vitrodyne V1000 and immersed in an appropriate aqueous media.

The strain rate is set at 200 μm/s and the modulus calculated by measuring the slope of the curve over the first 0.5% strain. The E' modulus and elongation to break (EtB) are quoted in MPa and percent (%), respectively.

Example 43

Properties of PEG-Urea Polymers, Formulation and Lenses. Table 1. describes the how each Example synthesis (1-38) was formulated in accordance to Example 39; cure energy determined in accordance to Example 40; and lenses prepared in accordance to Example 41. The modulus and EtB of the lenses are evaluated in accordance to Example 42.

Example 44

Thermal Stability of Lenses

PEG-Urea lenses held for prolonged periods at 80° C. show that lenses having branching functionality comprising a mixture of hexamethylenetriamineylene triamine (Aldrich Chemicals) and the isocyanurate trimer of isophorone diisocyanate (VESTANAT T1890/100) (Example 31) are more thermally stable than lenses using only hexamethylenetriamineylene triamine as the branching unit (Example 36). The lead indicator for thermal stability is an irreversible change in lens diameter with storage time at 80° C. compared to the time zero measurement.

The in vitro lens diameter is measured on a calibrated optical comparator. The liquid media, in which the lens is placed during the measurement, is a buffer solution having an osmolarity of 250-350 mOsmol.

TABLE 1

| Synthesis | Formulation | | | | | Lens properties | |
| --- | --- | --- | --- | --- | --- | --- | --- |
| Example | Yield (%) | Water concentration (%) | Irgacure 2959 conc. Based on solid polymer (%) | OH-Tempo conc. Based on solid polymer (ppm) | Cure energy (mJ) | Viscosity (mPa s) | E' Modulus after 1x autoclave (MPa) | Max Elongation to Break after 1x autoclave (%) |
| 1 | 77 | 59 | 0.1 | 50 | 29 | 75000 | 1.07 | 170 |
| 2 | 81 | 57 | 0.15 | 50 | 10 | 300 | 0.85 | 157 |
| 3 | 75 | 57 | 0.15 | 50 | 10 | 355 | 0.65 | 201 |
| 4 | 82 | 57 | 0.15 | 50 | 11 | 1360 | 1.00 | 147 |
| 5 | 67 | 57 | 0.15 | 50 | 10 | 800 | 0.97 | 173 |
| 6 | 84 | 57 | 0.15 | 50 | 10 | 370 | 0.69 | 171 |
| 7 | 84 | 57 | 0.15 | 50 | 17 | 330 | 0.70 | 190 |
| 8 | 86 | 57 | 0.15 | 50 | 10 | 620 | 0.69 | 220 |
| 9 | 65 | 71 | 0.15 | 50 | 21 | 200 | 0.51 | 241 |
| 10 | 67 | 65 | 0.15 | 50 | 17 | 150 | 0.66 | 176 |
| 11 | 84 | 57 | 0.15 | 50 | 10 | 53000 | 0.95 | 194 |
| 12 | 80 | 57 | 0.15 | 50 | 18 | 6300 | 0.95 | 194 |
| 13 | 82 | 63 | 0.15 | 50 | 20 | 4330 | 0.51 | 224 |
| 14 | 85 | 57 | 0.15 | 50 | 18 | 3000 | 0.74 | 254 |
| 15 | 78 | 64 | 0.15 | 50 | 16 | 61000 | — | — |
| 16 | 61 | 57 | 0.15 | 50 | 14 | 12600 | 0.71 | 211 |
| 17 | — | 77 | 0.15 | 50 | 26 | 180 | 0.55 | 237 |
| 18 | 81 | 75 | 0.15 | 50 | 20 | 125 | 0.73 | 192 |
| 19 | 83 | 70 | 0.15 | 50 | 20 | 200 | 0.81 | 210 |
| 20 | 65 | 65 | 0.15 | 50 | 14 | 660 | 1.04 | 190 |
| 21 | 82 | 65 | 0.15 | 50 | 14 | 340 | 1.00 | 198 |
| 22 | 71 | 70 | 0.15 | 50 | 17 | 90 | 1.03 | 200 |
| 23 | 87 | 70 | 0.15 | 50 | 14 | 6350 | 1.11 | 200 |
| 24 | 87 | 70 | 0.15 | 50 | 14 | 1100 | 1.05 | 170 |
| 25 | 67 | 65 | 0.15 | 50 | 14 | 1500 | — | — |
| 26 | 82 | 65 | 0.15 | 50 | 16 | 900 | 0.7 | 220 |
| 27 | 78 | 65 | 0.15 | 50 | 19 | 500 | 0.85 | 197 |
| 28 | 89 | 63 | 0.15 | 50 | 17 | 2450 | 0.85 | 200 |
| 29 | 89 | 65 | 0.15 | 50 | 17 | 245 | 0.88 | 158 |
| 30 | 84 | 60 | 0.15 | 50 | 15 | 1950 | 0.79 | 164 |
| 31 | 83 | 65 | 0.15 | 50 | 17 | 570 | 0.72 | 217 |
| 32 | 87 | 65 | 0.15 | 50 | 18.5 | 820 | 0.75 | 209 |
| 33 | 79 | 60 | 0.15 | 50 | 17 | 880 | 0.68 | 200 |
| 34 | 81 | 60 | 0.15 | 50 | 17 | 1100 | 0.73 | 180 |
| 35 | 81 | 65 | 0.15 | 50 | 17 | 420 | 0.73 | 165 |
| 36 | 84 | 65 | 0.15 | 50 | 20 | 180 | 0.62 | 188 |
| 37 | — | 68 | 0.15 | 50 | 18.5 | 180 | 0.65 | 134 |
| 38 | 82 | 68 | 0.2 | 80 | 19 | 5200 | 0.62 | 189 |

TABLE 2

| Storage time length @ 80° C. | change in lens diameter[1] $\Delta D_1$ (mm) | change in lens diameter[2] $\Delta D_2$ (mm) | $\dfrac{\Delta D_2 - \Delta D_1}{\Delta D_2}$ * |
|---|---|---|---|
| 2 weeks | 0.08 | 0.15 | 46% |
| 3 weeks | 0.2 | 0.31 | 35% |
| 4 weeks | 0.26 | 0.43 | 39% |

[1]Lenses made from Pre-polymer of Example 31.
[2]Lenses made from prepolymer of Example 36.
*Reduction of irreversible change in lens diameter with storage time at about 80° C. (i.e., difference in lens diameter between measurements at time zero and a given length of storage time at about 80° C.) when comparing with a contact lens prepared from a radiation-curable prepolymer without segments derived from a triisocyanate.

Example 45

Stability of Lenses to Autoclave Conditions

PEG-Urea lenses that are subjected to more than one autoclave cycle (121° C. for a 30 min cycle) show that lenses having branching functionality comprising a mixture of hexamethylenetriamineylene triamine (Aldrich Chemicals) and the isocyanurate trimer of isophorone diisocyanate (VESTANAT T1890/100) (Example 31) exhibit smaller increased changes in modulus, with successive autoclave cycles, than lenses using only hexamethylenetriamineylene triamine as the branching unit (Example 36).

TABLE 3

| Cycles of Autoclave | Autoclave-induced modulus change[1] $\Delta M_1$ (MPa) | autoclave-induced modulus change[2] $\Delta M_1$ (MPa) | $\dfrac{\Delta M_2 - \Delta M_1}{\Delta M_2}$ ** |
|---|---|---|---|
| between 1st and 2nd autoclave cycles | 0.07 MPa | 0.14 MPa | 50% |
| between 1st and 3rd autoclave cycles | 0.13 MPa | 0.23 MPa | 43% |

[1]Lenses made from Pre-polymer of Example 31.
[2]Lenses made from prepolymer of Example 36.
**Reduction of autoclave-induced modulus change (i.e., difference in modulus between before and after a number of autoclave cycles) when comparing with a contact lens prepared from a radiation-curable prepolymer without segments derived from a triisocyanate.

Example 46

Organic Extractables of PEG-Urea Lenses

PEG-Urea lenses that are subject organic extraction in accordance to ISO 10340 show that lenses having branching functionality comprising a of mixture of hexamethylenetriaminelylene triamine (Aldrich Chemicals) and the isocyanurate trimer of isophorone diisocyanate (VESTANAT T1890/100) (Example 31) exhibit lower extractables than lenses using only hexamethylenetriamineylene triamine as the branching unit (Example 36).

TABLE 4

| residue | Lenses made from Prepolymer of Example 31 | Lenses made from Prepolymer of Example 36 |
|---|---|---|
| % extractables in Methanol | 0.86% | 1.75% |

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A crosslinkable polyurea prepolymer, which is a reaction product of an amine- or isocyanate-capped polyurea and a multifunctional compound having at least one ethylenically unsaturated group and a function group coreactive with the capped amine or isocyanate groups of the amine- or isocyanate-capped polyurea, wherein the amine- or isocyanate-capped polyurea is a copolymerization product of a mixture comprising the components of:

(a) at least one aminoalkyl polyalkylene glycol of formula (1)

$$CG-(R_1-O)_p-(R_2-O)_m-(R_3-O)_p-CG' \qquad (1)$$

wherein CG and CG' independently of each other are a primary or secondary amino group, or an amino-$C_1$-$C_{12}$ alkyl, $R_1$, $R_2$, and $R_3$, independently of one other, are each linear or branched $C_2$-$C_4$-alkylene or hydroxy-substituted $C_2$-$C_8$ alkylene radical, and n, m and p, independently of one another, are each a number from 0 to 500, wherein the sum of (n+m+p) is 5 to 1000, (b) optionally at least one organic di- or poly-amine, wherein the organic diamine is a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or araliphatic diamine, and wherein the organic poly amine is a compound of formula $$\underset{R_4}{HN}-B_1'-\underset{R_4'}{NH}, \qquad (2)$$

wherein $R_4$ and $R_4'$ independently of each other are hydrogen or unsubstituted or substituted $C_1$-$C_6$ alkyl or together are a direct, ring-forming bond, and $B_1'$ is a bivalent radical selected from the group consisting of a linear or branched $C_3$-$C_{24}$alkylene, an unsubstituted $C_6$-$C_{10}$arylene, a $C_1$-$C_4$ alkyl-substituted $C_6$-$C_{10}$ arylene, a $C_7$-$C_{18}$ aralkylene, $C_6$-$C_{10}$ arylene-$C_1$-$C_2$ alkylene-$C_8$-$C_{10}$arylene, $C_3$-$C_8$ cycloalkylene, $C_3$-$C_8$ cycloalkylene-$C_1$-$C_6$ alkylene, $C_3$-$C_8$ cycloalkylene-$C_1$-$C_2$ alkylene-$C_3$-$C_8$ cycloalkylene or $C_1$-$C_6$ alkylene-$C_3$-$C_8$ cycloalkylene-$C_1$-$C_6$ alkylene, each of which is interrupted by at least one groups of —NH— or has at least one primary or secondary amine group, (c) optionally at least one diisocyanate selected from the group consisting of a linear $C_3$-$C_{24}$ aliphatic diisocyanate, a branched $C_3$-$C_{24}$ aliphatic diisocyanate, a $C_5$-$C_{24}$ cycloaliphatic diisocyanate, a $C_5$-$C_{24}$ aliphatic-cycloaliphatic diisocyanate, a $C_8$-$C_{24}$ aromatic diisocyanate, a $C_6$-$C_{24}$ araliphatic diisocyanate, and mixtures thereof, and (d) at least one polyisocyanate having at least three isocyanate groups, wherein the polyisocyanate is selected from the group consisting of a linear or branched $C_3$-$C_{24}$ aliphatic polyisocyanate, a $C_6$-$C_{45}$ cycloaliphatic or aliphatic-cycloaliphatic compound containing 3-6 isocyanate groups and at least one heteroatom selected from the group consisting of oxygen and nitrogen, a $C_6$-$C_{24}$ aromatic or araliphatic polyisocyanate, an isocyanurate polyisocyanate, and mixtures thereof, wherein the crosslinkable polyurea prepolymer is able to form a hydrogel.

2. The crosslinkable polyurea prepolymer of claim 1, wherein the mixture comprises component (b) including a triamine, wherein the component (d) includes the isocyanurate trimer of hexamethylene diisocyanate, 2,4,6-toluene triisocyanate, p,p',p''-triphenylmethane triisocyanate, or the trifunctional trimer (isocyanurate) of isophorone diisocyanate.

3. The crosslinkable polyurea prepolymer of claim 1, wherein the crosslinkable polyurea prepolymer has formula (4)

$$CP-(Q)_q \qquad (4)$$

wherein q is an integer of $\geq 3$, Q is an organic radical that comprises at least one crosslinkable group, CP is a multivalent branched copolymer fragment comprising segments A and U and optionally segments B and T, wherein:

A is a bivalent radical of formula

wherein $A_1$ is the bivalent radical of $-(R_1-O)_n-(R_2-O)_m-(R_3-O)_p-$, a linear or branched $C_2$-$C_{24}$ aliphatic bivalent radical, a $C_5$-$C_{24}$ cycloaliphatic or aliphatic-cycloaliphatic bivalent radical, or a $C_6$-$C_{24}$ aromatic or araliphatic bivalent radical, $R_1$, $R_2$, $R_3$, n, m, and p each are defined above, and $R_A$ and $R_A'$ independently of each other is hydrogen, an unsubstituted $C_1$-$C_6$alkyl, a substituted $C_1$-$C_6$alkyl, or a direct, ring-forming bond;

T is a bivalent radical of formula

wherein $R_T$ is a bivalent aliphatic, cycloaliphatic, aliphatic-cycloaliphatic, aromatic, araliphatic or aliphatic-heterocyclic radical;

U is a trivalent radical of formula

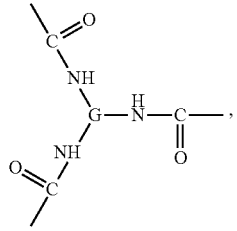

wherein G is a linear or branched $C_3$-$C_{24}$ aliphatic trivalent radical, a $C_5$-$C_{45}$ cycloaliphatic or aliphatic-cycloaliphatic trivalent radical, or a $C_3$-$C_{24}$ aromatic or araliphatic trivalent radical;

B is a radical of formula

wherein $R_B$ and $R_B'$ independently of each other is hydrogen, an unsubstituted $C_1$-$C_6$alkyl, a substituted $C_1$-$C_6$alkyl, or a direct, ring-forming bond, $B_1$ is a bivalent aliphatic, cycloaliphatic, aliphatic-cycloaliphatic, aromatic or araliphatic hydrocarbon radical that has at least one primary or secondary amine group or is interrupted by at least one amine group $-NR_m-$ in which $R_m$ is hydrogen, a radical Q mentioned above or a radical of formula

wherein Q is as defined above, and CP' is a bivalent copolymer fragment comprising at least two of the above-mentioned segments A, B, T and U; provided that in the copolymer fragments CP and CP' a segment A or B is followed by a segment T or U in each case; provided that in the copolymer fragments CP and CP' a segment T or U is followed by a segment A or B in each case; provided that the radical Q in formulae (4) and (9) is bonded to a segment A or B in each case; and provided that the N atom of $-NR_m-$ is bonded to a segment T or U when $R_m$ is a radical of formula (9).

4. The crosslinkable polyurea prepolymer of claim 3, wherein the trivalent radical G has formula (3)

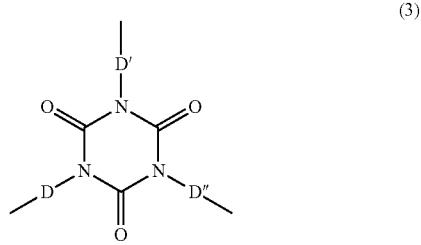

wherein D, D' and D'' independent of one another are a linear or branched divalent $C_1$-$C_{12}$ alkyl radical, a divalent $C_5$-$C_{14}$ alkylcycloalkyl radical.

5. The crosslinkable polyurea prepolymer of claim 4, wherein Q is (i) an organic radical $R_5$ which is an olefinically unsaturated copolymerizable radical having 2 to 24 carbon atoms which may be further substituted, (ii) a radical of formula

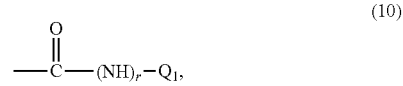

wherein $Q_1$ is, for example, a radical of formula

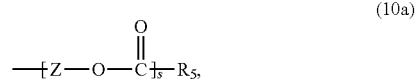

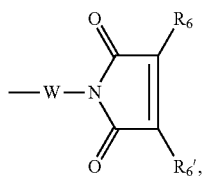
(10b)

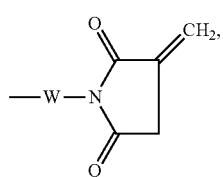
(10c)

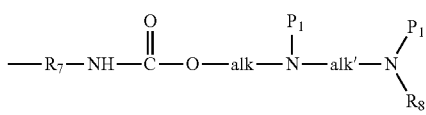
(10d)

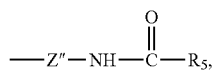
(10e)

and wherein

Z is linear or branched $C_2$-$C_{12}$alkylene, $R_5$ is an olefinically unsaturated copolymerisable radical having from 2 to 24 carbon atoms which may be further substituted, W is a $C_2$-$C_{12}$alkylene radical, phenylene radical or $C_7$-$C_{12}$aralkylene radical, each of $R_6$ and $R_6'$ independently of each other is hydrogen, $C_1$-$C_4$alkyl or halogen, $R_7$ is a bivalent aliphatic, cycloaliphatic, aliphatic-cycloaliphatic, aromatic or araliphatic hydrocarbon radical, $R_8$ is hydrogen or $C_1$-$C_4$alkyl, each of alk and alk' independently of the other is a linear or branched $C_1$-$C_{12}$alkylene radical, each of r and s independently of each other is the number 0 or 1, $Z''$ is $C_1$-$C_6$alkylene and $P_1$ and $P_1'$ independently of each other are a radical of the above-mentioned formula (10) wherein $Q_1$ is a radical of the above formula (10a), (10b), (10c) or (10e), or (iii) Q together with —$NR_A$—, —$NR_A'$—, —$NR_B$—, or —$NR_B'$—, forms a cyclic ring of formula

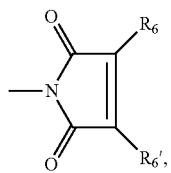
(10b')

wherein each of $R_6$ and $R_6'$ is as defined above and preferably each is methyl.

6. The crosslinkable polyurea prepolymer of claim 5, wherein Q is a radical of formula (10) wherein r is 0 and $Q_1$ is a radical of formula (10a) wherein m is 0, $R_5$ is a radical of formula

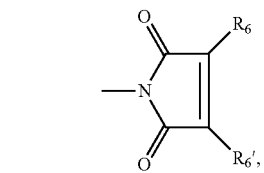
(11)

wherein t is the number 0 or 1, $R_9$ is hydrogen, $C_1$-$C_4$alkyl or halogen, each of $R_{10}$ and $R_{11}$ independently of the other is hydrogen, $C_1$-$C_4$alkyl, phenyl, carboxy or halogen, and Z' is linear or branched $C_1$-$C_{12}$alkylene or unsubstituted or $C_1$-$C_4$alkyl- or $C_1$-$C_4$alkoxy-substituted phenylene or $C_7$-$C_{12}$aralkylene.

7. The crosslinkable polyurea prepolymer of claim 5, wherein Q is a radical of formula of (10) wherein r is 1 and $Q_1$ is a radical of formula (10a) wherein s is 1, $R_5$ is a radical of formula

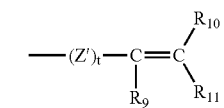
(11)

wherein t is 0, $R_9$ is hydrogen, $C_1$-$C_4$alkyl, $R_{10}$ is hydrogen, methyl, chlorine or phenyl, $R_{11}$ hydrogen or carboxy, and Z' is linear or branched $C_1$-$C_{12}$alkylene.

8. The crosslinkable polyurea prepolymer of claim 5, wherein Q is a radical of formula

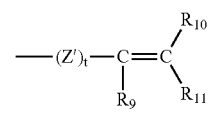
(10')

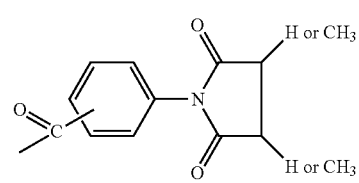
(10'')

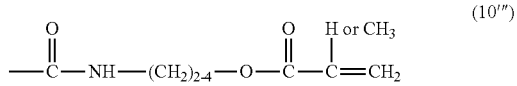  (10''')

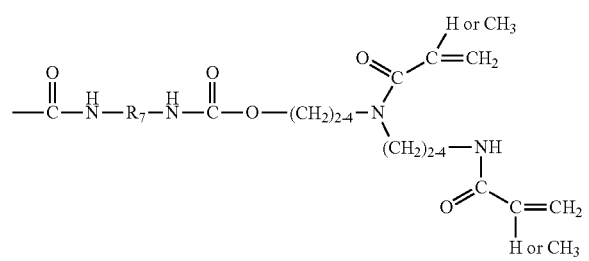  (10'''')

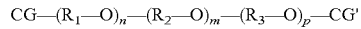  (10''''')

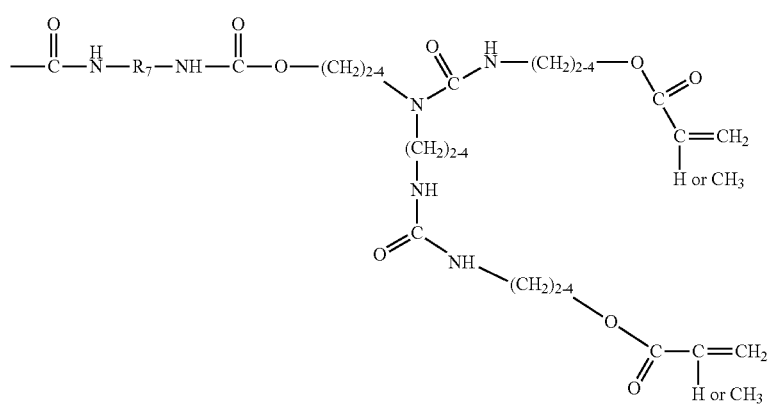

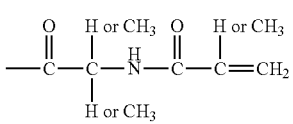  (10*)

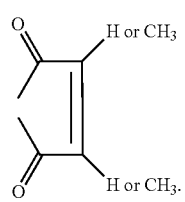  (10b'')

wherein for $R_7$ the meanings and preferences given above apply in each case.

9. The crosslinkable polyurea prepolymer of claim 8, wherein Q is a radical of formula (10') or (10''').

10. A polymer obtained by crosslinking a crosslinkable polyurea prepolymer according to a claim 1, in the presence or absence of an additional vinylic monomer.

11. A polymer obtained by crosslinking a crosslinkable polyurea prepolymer according to a claim 1, in the absence of an additional vinylic monomer.

12. A medical device, comprising a polyurea hydrogel which is an actinically crosslinking product of a crosslinkable polyurea prepolymer in the absence or presence of an additional vinylic monomer and optionally in the presence of a photo-initiator, wherein the prepolymer is a reaction product of an amine- or isocyanate-capped polyurea and a multifunctional compound having at least one ethylenically unsaturated group and a function group coreactive with the capping amine or isocyanate groups of the amine- or isocyanate-capped polyurea, wherein the amine- or isocyanate-capped polyurea is a copolymerization product of a mixture comprising the components of:

(a) at least one aminoalkyl polyalkylene glycol of formula (1)

$$CG-(R_1-O)_n-(R_2-O)_m-(R_3-O)_p-CG' \qquad (1)$$

wherein CG and CG' independently of each other are a primary or secondary amino group, or an amino-$C_1$-$C_{12}$ alkyl, $R_1$, $R_2$, and $R_3$, independently of one other, are each linear or branched $C_2$-$C_4$-alkylene or hydroxy-substituted $C_2$-$C_8$ alkylene radical, and n, m and p, independently of one another, are each a number from 0 to 500, wherein the sum of (n+m+p) is 5 to 1000, (b) optionally at least one organic di- or poly-amine, wherein the organic diamine is a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or araliphatic diamine, and wherein the organic poly amine is a compound of formula

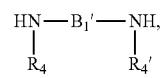  (2)

wherein $R_4$ and $R_4'$ independently of each other are hydrogen or unsubstituted or substituted $C_1$-$C_6$ alkyl or together are a direct, ring-forming bond, and $B_1'$ is a bivalent radical selected from the group consisting of a linear or branched $C_3$-$C_{24}$alkylene, an unsubstituted $C_6$-$C_{10}$arylene, a $C_1$-$C_4$ alkyl-substituted $C_6$-$C_{10}$ arylene, a $C_7$-$C_{18}$ aralkylene, $C_6$-$C_{10}$ arylene-$C_1$-$C_2$ alkylene-$C_6$-$C_{10}$arylene, $C_3$-$C_6$ cycloalkylene, $C_3$-$C_6$ cycloalkylene-$C_1$-$C_6$ alkylene, $C_3$-$C_8$ cycloalkylene-$C_1$-$C_2$ alkylene-$C_3$-$C_8$ cycloalkylene or $C_1$-$C_6$ alkylene-$C_3$-$C_8$ cycloalkylene-$C_1$-$C_6$ alkylene, each of which is interrupted by at least one groups of —NH— or has at least one primary or secondary amine group, (c) optionally at least one diisocyanate selected from the group consisting of a linear $C_3$-$C_{24}$ aliphatic diisocyanate, a branched $C_3$-$C_{24}$ aliphatic diisocyanate, a $C_5$-$C_{24}$ cycloaliphatic diisocyanate, a $C_5$-$C_{24}$ aliphatic-cycloaliphatic diisocyanate, a $C_6$-$C_{24}$ aromatic diisocyante, a $C_6$-$C_{24}$ araliphatic diisocyanate, and mixtures thereof, and (d) at least one polyisocyanate having at least three isocyanate groups, wherein the polyisocyanate is selected from the group consisting of a linear or branched $C_3$-$C_{24}$ aliphatic polyisocyanate, a $C_6$-$C_{45}$ cycloaliphatic or aliphatic-cycloaliphatic compound containing 3-6 isocyanate groups and at least one heteroatom selected from the group consisting of oxygen and nitrogen, a $C_6$-$C_{24}$ aromatic or araliphatic polyisocyanate, an isocyanurate polyisocyanate, and mixtures thereof, wherein the medical device is a contact lens.

13. The medical device of claim 12, wherein the mixture comprises component (b) including a triamine, wherein the component (d) includes the isocyanurate trimer of hexamethylene diisocyanate, 2,4,6-toluene triisocyanate, p,p',p"-triphenylmethane triisocyanate, or the trifunctional trimer (isocyanurate) of isophorone diisocyanate.

14. The medical device of claim 12, wherein the crosslinkable polyurea prepolymer has formula (4)

$$CP\text{-}(Q)_q \qquad (4)$$

wherein q is an integer of $\geq 3$, Q is an organic radical that comprises at least one crosslinkable group, CP is a multivalent branched copolymer fragment comprising segments A and U and optionally segments B and T, wherein:

A is a bivalent radical of formula

  (5), wherein $A_1$ is the bivalent radical of $-(R_1-O)_n-(R_2-O)_m-(R_3-O)_p-$, a linear or branched $C_2$-$C_{24}$ aliphatic bivalent radical, a $C_5$-$C_{24}$ cycloaliphatic or aliphatic-cycloaliphatic bivalent radical, or a $C_6$-$C_{24}$ aromatic or araliphatic bivalent radical, $R_1$, $R_2$, $R_3$, n, m, and p each are defined above, and $R_A$ and $R_A'$ independently of each other is hydrogen, an unsubstituted $C_1$-$C_6$alkyl, a substituted $C_1$-$C_6$alkyl, or a direct, ring-forming bond;

T is a bivalent radical of formula

  (6), wherein $R_T$ is a bivalent aliphatic, cycloaliphatic, aliphatic-cycloaliphatic, aromatic, araliphatic or aliphatic-heterocyclic radical;

U is a trivalent radical of formula

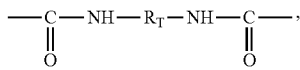  (7)

wherein G is a linear or branched $C_3$-$C_{24}$ aliphatic trivalent radical, a $C_5$-$C_{45}$ cycloaliphatic or aliphatic-cycloaliphatic trivalent radical, or a $C_3$-$C_{24}$ aromatic or araliphatic trivalent radical;

B is a radical of formula

  (8), wherein $R_B$ and $R_B'$ independently of each other is hydrogen, an unsubstituted $C_1$-$C_6$alkyl, a substituted $C_1$-$C_6$alkyl, or a direct, ring-forming bond, $B_1$ is a bivalent aliphatic, cycloaliphatic, aliphatic-cycloaliphatic, aromatic or araliphatic hydrocarbon radical that has at least one primary or secondary amine group or is interrupted by at least one amine group $-NR_m-$ in which $R_m$ is hydrogen, a radical Q mentioned above or a radical of formula

  (9), wherein Q is as defined above, and CP' is a bivalent copolymer fragment comprising at least two of the above-mentioned segments A, B, T and U; provided that in the copolymer fragments CP and CP' a segment A or B is followed by a segment T or U in each case; provided that in the copolymer fragments CP and CP' a segment T or U is followed by a segment A or B in each case; provided that the radical Q in formulae (4) and (9) is bonded to a segment A or B in each case; and provided that the N atom of $-NR_m-$ is bonded to a segment T or U when $R_m$ is a radical of formula (9).

15. The medical device of claim 14, wherein Q is (i) an organic radical $R_5$ which is an olefinically unsaturated copolymerizable radical having 2 to 24 carbon atoms which may be further substituted, (ii) a radical of formula

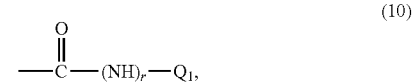  (10)

wherein $Q_1$ is, for example, a radical of formula

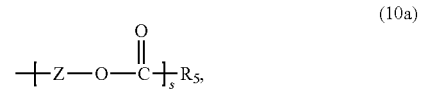  (10a)

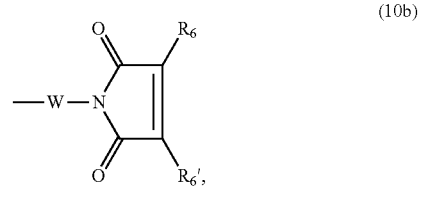  (10b)

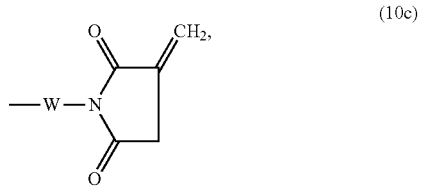  (10c)

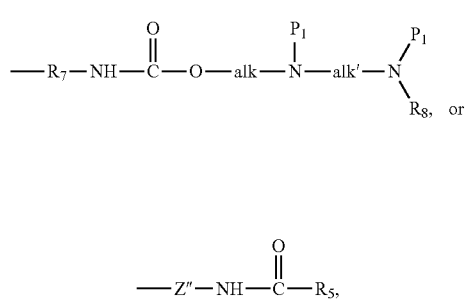 (10d)

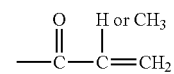 (10e)

and wherein

Z is linear or branched $C_2$-$C_{12}$alkylene, $R_5$ is an olefinically unsaturated copolymerisable radical having from 2 to 24 carbon atoms which may be further substituted, W is a $C_2$-$C_{12}$alkylene radical, phenylene radical or $C_7$-$C_{12}$aralkylene radical, each of $R_6$ and $R_6'$ independently of each other is hydrogen, $C_1$-$C_4$alkyl or halogen, $R_7$ is a bivalent aliphatic, cycloaliphatic, aliphatic-cycloaliphatic, aromatic or araliphatic hydrocarbon radical, $R_8$ is hydrogen or $C_1$-$C_4$alkyl, each of alk and alk' independently of the other is a linear or branched $C_1$-$C_{12}$alkylene radical, each of r and s independently of each other is the number 0 or 1, Z" is $C_1$-$C_6$alkylene and $P_1$ and $P_1'$ independently of each other are a radical of the above-mentioned formula (10) wherein $Q_1$ is a radical of the above formula (10a), (10b), (10c) or (10e), or (iii) Q together with —$NR_A$—, —$NR_A'$—, —$NR_B$—, or —$NR_B'$—, forms a cyclic ring of formula

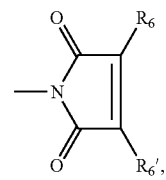 (10b')

wherein each of $R_6$ and $R_6'$ is as defined above and preferably each is methyl.

16. The medical device of claim 15, wherein Q is a radical of formula

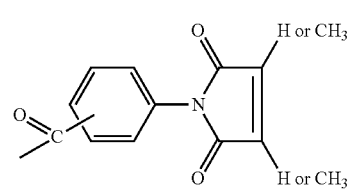 (10')

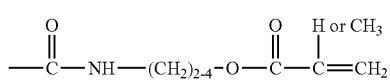 (10'')

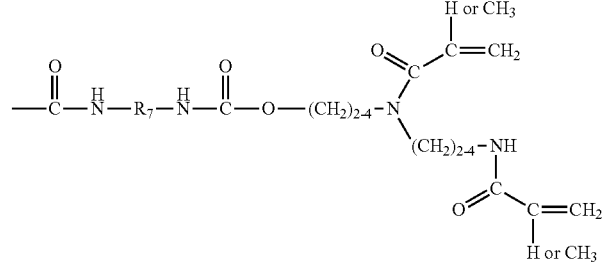 (10''')

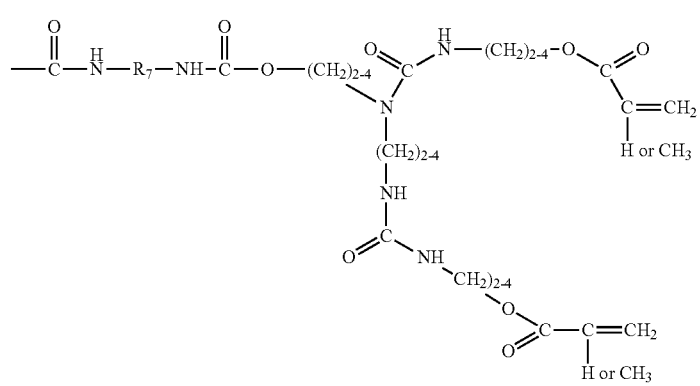 (10'''')

(10''''')

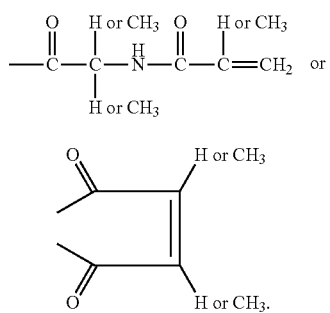

(10*)

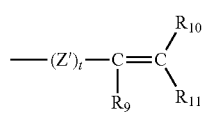

(10b″)

wherein for $R_7$ the meanings and preferences given above apply in each case.

17. The medical device of claim 15, wherein Q is a radical of formula (10) wherein r is 0 and $Q_1$ is a radical of formula (10a) wherein m is 0, $R_5$ is a radical of formula

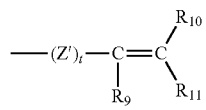

(11)

wherein t is the number 0 or 1, $R_9$ is hydrogen, $C_1$-$C_4$alkyl or halogen, each of $R_{10}$ and $R_{11}$ independently of the other is hydrogen, $C_1$-$C_4$alkyl, phenyl, carboxy or halogen, and Z' is linear or branched $C_1$-$C_{12}$alkylene or unsubstituted or $C_1$-$C_4$alkyl- or $C_1$-$C_4$alkoxy-substituted phenylene or $C_7$-$C_{12}$aralkylene.

18. The medical device of claim 15, wherein Q is a radical of formula of (10) wherein r is 1 and $Q_1$ is a radical of formula (10a) wherein s is 1, $R_5$ is a radical of formula (11)

wherein t is 0, $R_9$ is hydrogen, $C_1$-$C_4$alkyl, $R_{10}$ is hydrogen, methyl, chlorine or phenyl, $R_{11}$ hydrogen or carboxy, and Z' is linear or branched $C_1$-$C_{12}$alkylene.

* * * * *